(12) United States Patent
Igarashi et al.

(10) Patent No.: US 8,211,579 B2
(45) Date of Patent: Jul. 3, 2012

(54) FUEL CELL START-UP CONTROL SYSTEM

(75) Inventors: Hitoshi Igarashi, Yokosuka (JP); Masatoshi Iio, Yokosuka (JP); Seiho Sugawara, Yokohama (JP); Atsushi Ooma, Yokohama (JP); Takashi Iimori, Yokosuka (JP); Mitsuhiro Kokubo, Yokosuka (JP); Takashi Fukuda, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 789 days.

(21) Appl. No.: 11/815,035

(22) PCT Filed: Jun. 13, 2006

(86) PCT No.: PCT/IB2006/001569

§ 371 (c)(1),
(2), (4) Date: Jul. 30, 2007

(87) PCT Pub. No.: WO2006/134461

PCT Pub. Date: Dec. 21, 2006

(65) Prior Publication Data

US 2008/0152972 A1    Jun. 26, 2008

(30) Foreign Application Priority Data

Jun. 13, 2005   (JP) ............................... 2005-172108
Jun. 13, 2005   (JP) ............................... 2005-172121
Sep. 30, 2005   (JP) ............................... 2005-286898

(51) Int. Cl.
*H01M 8/04*   (2006.01)

(52) U.S. Cl. ........ 429/429; 429/428; 429/443; 429/444; 429/454; 429/455; 429/456; 429/462; 429/512; 429/513; 429/515

(58) Field of Classification Search .................. None
See application file for complete search history.

(56) References Cited

U.S. PATENT DOCUMENTS

| | | | |
|---|---|---|---|
| 2002/0094467 A1 | 7/2002 | Nonobe et al. | |
| 2003/0129462 A1 | 7/2003 | Yang et al. | |
| 2003/0134181 A1* | 7/2003 | Fukuda et al. | 429/44 |
| 2003/0146094 A1* | 8/2003 | Preidel | 204/431 |
| 2003/0224231 A1* | 12/2003 | Penev | 429/24 |
| 2006/0008689 A1* | 1/2006 | Yonekura et al. | 429/25 |
| 2008/0044691 A1* | 2/2008 | Wake et al. | 429/13 |

FOREIGN PATENT DOCUMENTS

| | | |
|---|---|---|
| EP | 1102341 A2 | 5/2001 |
| EP | 1615283 A1 | 1/2006 |
| JP | 2002-216812 | 8/2002 |
| JP | 2004139984 A | 5/2004 |
| JP | 2004-165094 | 6/2004 |
| JP | 2004-521447 | 7/2004 |
| JP | 2005-515603 | 5/2005 |
| JP | 2005-158553 | 6/2005 |

(Continued)

*Primary Examiner* — Melvin C Mayes
*Assistant Examiner* — Colin W Slifka
(74) *Attorney, Agent, or Firm* — Young Basile

(57) ABSTRACT

A fuel cell has an anode, a cathode, and a proton-exchange membrane disposed between the anode and cathode. An exhaust anode gas exhausted from an outlet of the anode is directed back to an inlet of the anode. Hydrogen is added to the exhaust anode gas before the exhaust anode gas reaches the inlet.

28 Claims, 29 Drawing Sheets

FOREIGN PATENT DOCUMENTS

| | | |
|---|---|---|
| JP | 2005-183354 | 7/2005 |
| JP | 2006-049234 | 2/2006 |
| JP | 2006-120532 | 5/2006 |
| JP | 2006-310000 | 11/2006 |
| WO | 2005031901 A2 | 4/2005 |
| WO | 2005053075 A1 | 6/2005 |

* cited by examiner

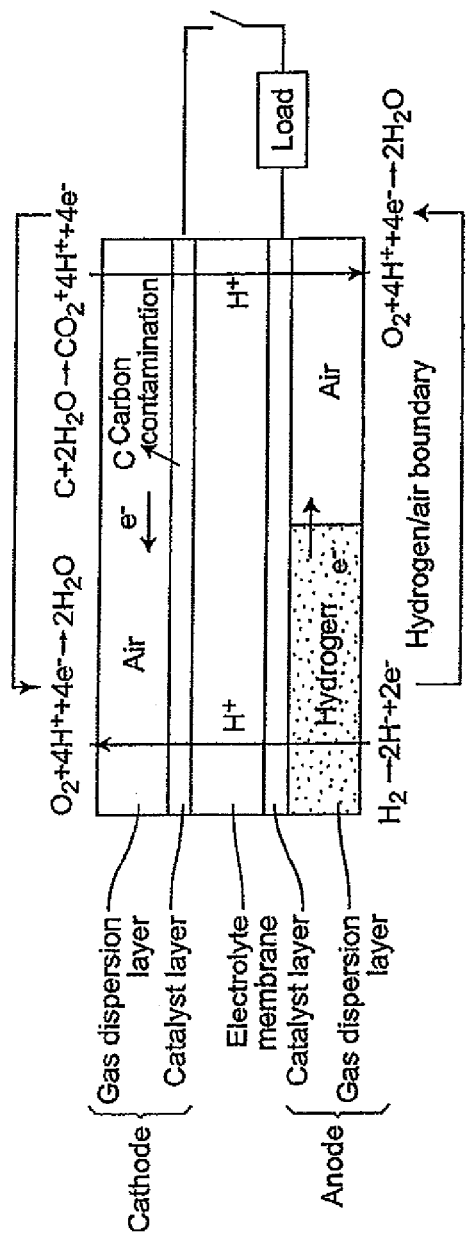

FIG. 12

| Scenario | | Means for solving the problem |
|---|---|---|
| | The following condition occurs, counter current flows, the carbon for the platinum catalyst carrier on the the electrolyte membrane causes carbon contamination | |
| Stopped (Left standing) | Cathode: $O_2$ is still remaining | Consume oxygen in cathode |
| | Anode: $H_2$ is still remaining, $O_2$ is entering from the outside | Lower voltage by consuming oxygen in cathode, Short-circuited resistance connection between anode and cathode |
| | Electric power drawn: none | |
| | Voltage at open end: high | |
| Start-up | Cathode: $O_2$ is entering from the outside | Consume oxygen in cathode |
| | Anode: When $H_2$ is supplied, $O_2$ and $H_2$ get mixed together | Replace hydrogen in anode |
| | Electric power drawn: none (supply of hydrogen takes priority over the drawing of electric energy) | |
| | Voltage at open end: high | Lower voltage by consuming oxygen in cathode |

FUEL CELL START-UP CONTROL SYSTEM

CROSS-REFERENCE TO RELATED APPLICATIONS

The present application claims priority to Japanese Patent Application No. 2005-172108, filed on Jun. 13, 2005, Japanese Patent Application No. 2005-172121, filed on Jun. 13, 2005, and Japanese Patent Application No. 2005-286898, filed on Sep. 30, 2005, the entire content of which applications is expressly incorporated by reference herein.

FIELD

The present invention pertains to a fuel cell system.

BACKGROUND

In conventional fuel cell systems, hydrogen gas supplied to the fuel cell stack was supplied via a secondary variable pressure regulator that upon start up set the setting for the secondary variable pressure regulator higher than the supply pressure for normal power generation, drove the hydrogen pump in addition to opening the hydrogen supply solenoid valve, and exhausted the oxygen remaining inside the fuel chamber in a short period of time and replaced it with hydrogen gas.

SUMMARY

However, according to the technology disclosed in Unexamined Japanese Patent Application Publication No. 2004-139984, when oxygen was exhausted to the outside, hydrogen was exhausted along with it, resulting in wasteful exhaust of the hydrogen, which was problematic in that the power generation efficiency of the fuel cell system deteriorated. Therefore, the purpose of the present invention is to prevent the deterioration of the MEA when the fuel cell is started up, prevent the emission of the hydrogen, and suppress the deterioration of the efficiency of the fuel cell.

The present invention pertains to a fuel cell system equipped with a hydrogen supply flow channel that supplies hydrogen from the outside to the anode of the fuel cell and a bypass flow channel connected midstream on the hydrogen supply flow channel so as to circulate the exhaust anode gas that is exhausted from the anode to the anode and comprises a gas composition control means that controls the gas composition of the gas mixture consisting of the hydrogen supplied to the anode and the exhaust anode gas, a gas exhaust control means that controls the exhaust of the exhaust anode gas to the outside, and a controller that controls the gas composition control means and the gas exhaust control means. The controller closes the gas exhaust control valve when start up is performed with oxidant gas present in the anode, circulates the exhaust anode gas to the anode via the bypass flow channel and controls the gas composition control means so that the concentration of the gas that constitutes the gas mixture reaches a predetermined concentration.

According to the present invention, by prohibiting the exhaust of exhaust anode gas to the outside when the fuel cell system is started up as well as circulating the exhaust anode gas to the anode and controlling the composition of the gas mixture consisting of the exhaust anode gas and the hydrogen from the outside to a predetermined concentration, the emission of the hydrogen to the outside and the corrosion of the cathode can be prevented.

BRIEF DESCRIPTION OF FIGURES

FIG. 12 is a diagram for explaining conventional problems.

DETAILED DESCRIPTION

Figure 1:
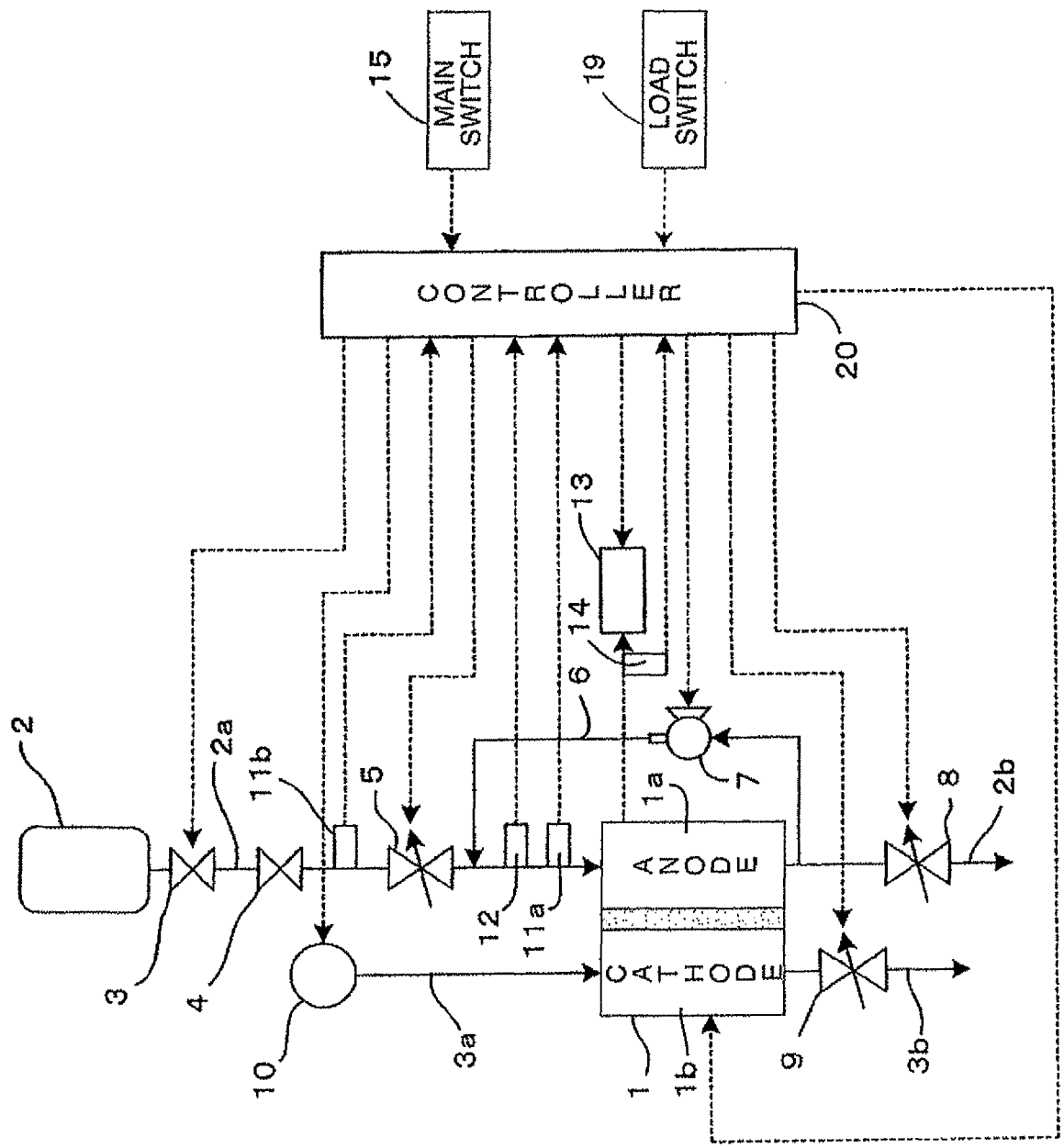
FIG. 1 is a block diagram of the fuel cell system.

The conventional proton-exchange membrane fuel cell is composed of a membrane electrode assembly (hereafter referred to as an MEA), which has a proton exchange membrane (positive ion exchange membrane) sandwiched between an anode and cathode, which are further sandwiched between separators. The fuel gas (hydrogen) supplied to the anode is hydrogen-ionized on the catalyst electrode and transferred to the cathode via the electrolyte membrane, which is humidified with the appropriate amount of moisture. The electrons generated while this takes place are drawn by an external circuit and used as direct current electric energy. Since oxidant gas, for example gas containing oxygen, or air, is supplied to the cathode, the hydrogen ions, electrons and oxidant gas react at the cathode to generate water. The chemical formula for this reaction is shown below.

Anode reaction: $H_2 \rightarrow 2H^+ + 2e^-$ (1)

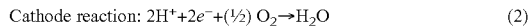

Cathode reaction: $2H^+ + 2e^- + (\frac{1}{2}) O_2 \rightarrow H_2O$ (2)

One assembly of the aforementioned proton-exchange membrane fuel cells is called a single cell. A stacked fuel cell is composed by stacking a predetermined number of these single cells. Also, the catalyst electrode is comprised of a carbon support and a reaction catalyst, for example a platinum catalyst, supported by the carbon.

However, when fuel cell 1 is stopped, left standing or started up in the unloaded state (the state in which electric current is not being transmitted to the circuit connected to fuel cell 1, the same applies hereinafter), the carbon in the cathode gets corroded resulting in deterioration of the MEA. FIG. 12 is used to explain this carbon corrosion.

In conventional fuel cell systems, when the fuel cell is stopped or the supply of hydrogen to the anode is begun (the state in which the hydrogen and oxygen inside the anode are separated) when starting the fuel cell in the unloaded state, H+ protons are transferred from the anode to the cathode, and the H+ protons that get transferred react with the oxygen in the cathode to form water (refer to the formula shown above). H+ protons are needed for this reaction, but e− electrons do not get transferred via the load when in the unloaded state. Therefore, the water and carbon carrier that are present in the cathode react and the e− electrons that are generated are used in the water-forming reaction described above. When this reaction takes place, the carbon in the cathode is consumed, causing deterioration of the MEA. On the other hand, at the anode, the oxygen that gets mixed with the hydrogen, the H+ protons that were generated when the carbon was consumed, and the e− electrons that were generated from the hydrogen protonation react to form water.

At this point, if the voltage at the open end is high, the transfer of e-electrons becomes active, thus promoting the aforementioned chemical reaction and resulting in even further deterioration of the MEA. When deterioration of the MEA progresses, the power generation voltage drops, resulting in reduced power generation efficiency.

For example, when starting up a fuel cell system that is not equipped with a bypass flow channel, if hydrogen is supplied with air still remaining in the anode, air, which gets pushed by the hydrogen from the initial phase that takes place after supply of hydrogen is begun, is exhausted from the anode exhaust flow channel, and then hydrogen gets exhausted after the air has been completely exhausted, resulting in lowered operating efficiency of the fuel cell system. In order to prevent this hydrogen from getting exhausted, it is necessary to close the purge valve.

If hydrogen is supplied to the anode from the hydrogen tank with the purge valve in the closed state, exhaust anode gas cannot be exhausted from the hydrogen exhaust flow channel, so the pressure inside of the anode rises. Although the maximum allowable pressure inside of the anode varies depending on the fuel cell specifications, once the maximum allowable pressure is reached, the rising of the hydrogen pressure is stopped, and hydrogen can no longer be supplied.

However, on the other hand, since hydrogen and oxygen are present inside of the anode, the reaction shown according to Formulas (1) and (2) progresses and power generation is performed. As is evident from these reaction formulas, these reactions consume the hydrogen and oxygen and lower the pressure inside of the anode, and the supply of hydrogen can be continued.

When start up is performed with the fuel cell in the unloaded condition, the purge valve is closed when hydrogen starts getting supplied to the anode, so even if hydrogen is supplied, the air in the anode does not get pushed out. The hydrogen and oxygen inside of the anode separate, creating a state in which a boundary exists between the hydrogen and oxygen. In this state, H+ protons are transferred from the anode to the cathode and the H+ protons that were transferred react with the oxygen in the cathode forming water. (See Formulas (1) and (2)). H+ protons as well as e− electrons are needed for this reaction, but when in the unloaded state, e− electrons do not get transferred via the circuit.

Therefore, the water and the carbon, which serves as the carrier for the catalyst, that are present inside of the cathode react to produce carbon dioxide and the e-electrons that are generated when the carbon dioxide is produced are used for the water-generating reaction that takes place at the cathode. When this reaction takes place, the carbon in the cathode is consumed, carbon corrosion takes place, which in turn causes the deterioration of MEA. On the other hand, inside the anode, the oxygen that got mixed with the hydrogen, the H+ protons that were generated when the carbon was consumed in the cathode and the e− electrons that were generated with the protons that got generated when hydrogen was produced react to produce water. In this manner, the carbon inside of the cathode causes corrosion, the deterioration of the fuel cell accelerates and power generation efficiency is lowered.

FIG. 1 is a diagram showing the constitution of an embodiment of the fuel cell system that applies to the present invention. This fuel cell system is equipped with fuel cell stack 1, hydrogen tank 2 that supplies the hydrogen to anode 1a of the fuel cell, compressor 10 that supplies the air to cathode 1b, bypass flow channel 6 that circulates the exhaust anode gas exhausted from anode 1a to anode 1a and circulating pump 7 installed on bypass flow channel 6 for controlling the circulation volume of the exhaust anode gas.

Highly pressurized hydrogen that has been stored in hydrogen tank 2 is supplied to anode 1a of fuel cell 1 via hydrogen supply flow channel 2a, and air is supplied to cathode 1b due to the operation of compressor 10 via air supply flow channel 3a. The hydrogen or air that was used for generating power in fuel cell 1 is emitted to the outside by gas emission flow channel 2b and air emission flow channel 3b. Purge valve 8 that controls the hydrogen emitted from gas emission flow channel 2b to the outside is installed on gas emission flow channel 2b.

Installed on hydrogen supply flow channel 2a are hydrogen tank base valve 3 that controls the supply of hydrogen from hydrogen tank 2, depressurizing valve 4 that reduces the pressure of the hydrogen from hydrogen tank 2 to a predetermined pressure, and hydrogen supply control valve 5 that controls the amount of hydrogen supplied to anode 1a. In addition, formed downstream (on the side at which fuel cell 1 is located) of hydrogen supply control valve 5 on hydrogen supply flow channel 2a and upstream of purge valve 8 on gas emission flow channel 2b is bypass flow channel 6, which bypasses fuel cell 1. Installed on bypass flow channel 6 is circulating pump 7 that circulates the exhaust anode gas exhausted from fuel cell 1 to anode 1a.

Therefore, when circulating pump 7 on bypass flow channel 6 operates while purge valve 8 installed on gas emission flow channel 2b is in the closed state, the exhaust anode gas exhausted from anode 1a of fuel cell 1 is supplied back to anode 1a via bypass flow channel 6. On the other side, on air emission flow channel 3b is installed air regulator 9 that regulates the air pressure in cathode 1b.

When hydrogen is supplied to anode 1a and air is supplied to cathode 1b, power generation is started at fuel cell 1 and the electric power generated by fuel cell 1 is drawn by power manager 13 and supplied to a load or a motor that acts as a drive source for a moving object.

This fuel cell system is equipped with controller 20 that performs integrated control. Input to controller 20 are the output from first pressure sensor 11a that detects the pressure of the gas mixture consisting of the hydrogen at the anode inlet and the exhaust anode gas, the output from second pressure sensor 11b that detects the pressure of the hydrogen that flows into hydrogen supply control valve 5, the output from hydrogen concentration sensor 12 that detects the hydrogen concentration at the anode inlet, and the output from voltage sensor 14 that detects the amount of power generated at fuel cell 1.

Controller 20 uses these input values to administer start up control of fuel cell 1, open/close control of hydrogen tank base valve 3, flow rate control of hydrogen supply control valve 5, operation control of compressor 10, operation control of circulating pump 7, open/close control of purge valve 8 and regulating control of air regulator 9.

Also input to controller 20 are the ON/OFF signal from main switch 15 that starts up the fuel cell system and the ON/OFF signal from load switch 19 that detects the unloaded state of fuel cell 1.

Figure 2:
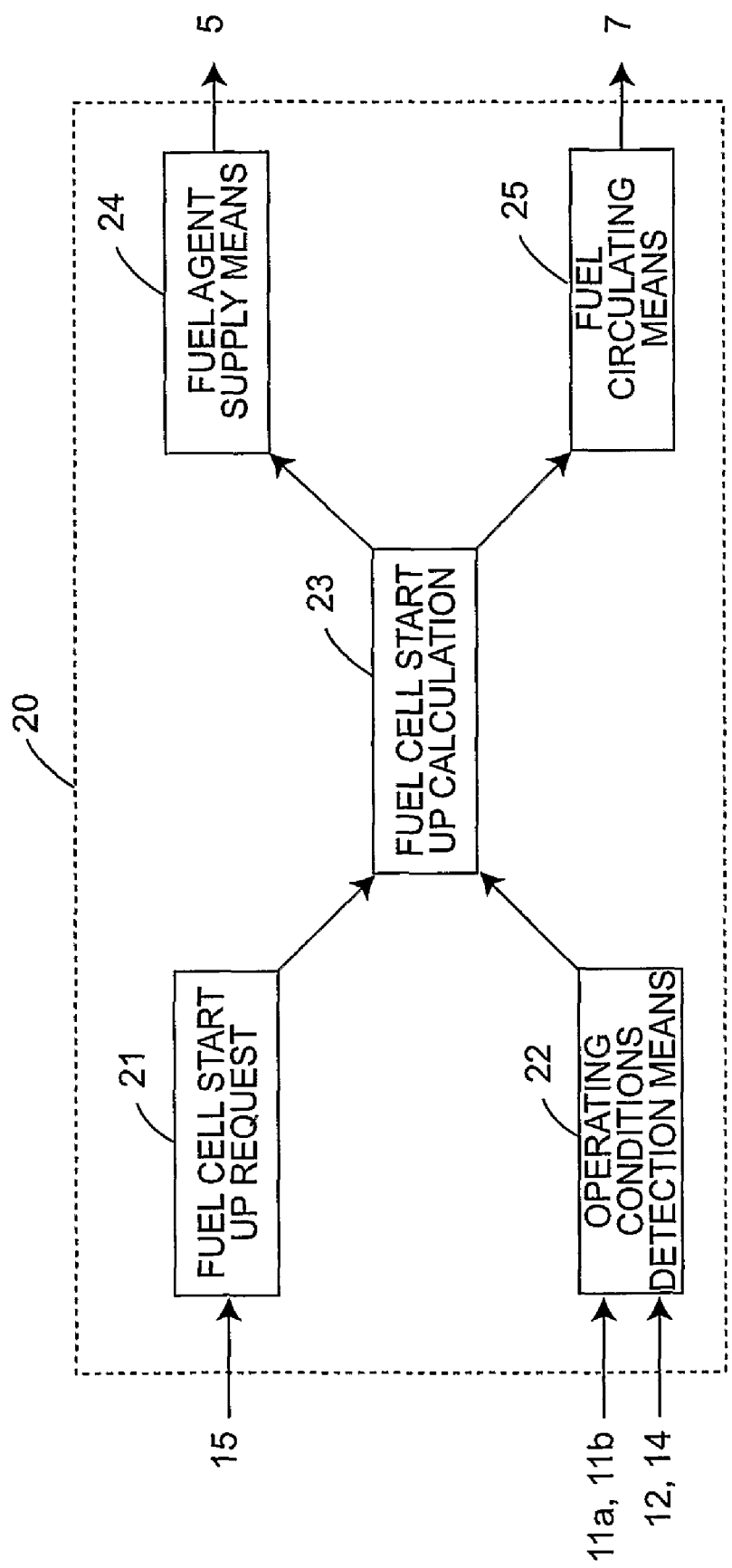
FIG. 2 is a block diagram of the controller.

FIG. 2 is a block diagram for explaining the constitution of controller 20. Controller 20 comprises start-up request determination portion 21 that determines the start-up request for fuel cell 1 based on the ON/OFF signal from the main switch 15, operating state detection portion 22 that detects the operating state of fuel cell 1 from the values detected by aforementioned first and second pressure sensors 11a and 11b, concentration sensor 12 and voltage sensor 14, start-up calculation portion 23 that inputs the start-up request determination result of fuel cell 1 and the operating state of fuel cell 1 and calculates the operating conditions of fuel cell 1 based on said input, fuel agent supply means control portion 24 that controls hydrogen supply control valve 5 based on the calculation results from start-up calculation portion 23 in order to control the amount of hydrogen supplied to anode 1a, and fuel agent circulating means control portion 25 that similarly controls circulating pump 7 based on the calculation results from start-up calculation portion 23 in order to control the amount of exhaust anode gas circulated through bypass flow channel 6.

Figure 3:
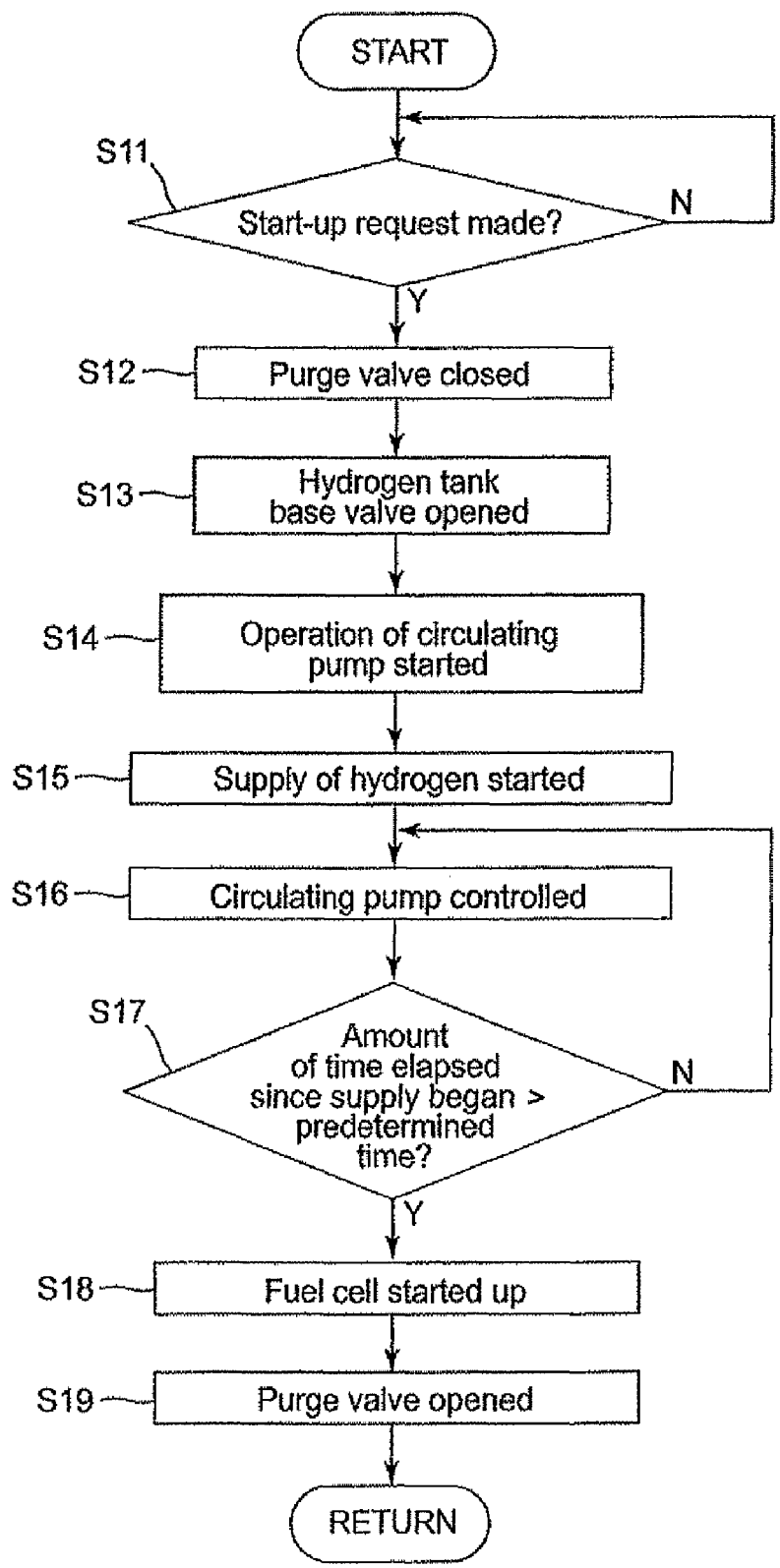
FIG. 3 is a flowchart for explaining the control process for the main embodiment.

FIG. 3 is a flowchart for explaining the control process executed by controller 20 for starting up the fuel cell system. This start-up control is executed when start up is performed in the unloaded state in which oxidant gas (air) is present inside of anode 1a, and electric current is not flowing to the circuit connected to fuel cell 1.

The oxidant gas present inside of anode 1a when fuel cell 1 is started up is the air that entered from the outside while the fuel cell was stopped. Therefore, start up control is executed with air present in anode 1a when the start up takes place. A means to detect the air inside of anode 1a (for example, an oxygen concentration detection sensor) can be used, and start up control can be executed if the value detected by the air detection means is a predetermined value or more. In addition, since the amount of air that enters into anode 1a enters by means of natural dispersion, and is therefore time-dependent, the stopped time of the fuel cell system can be measured so that when the stopped time is longer than a predetermined time, start up control can be executed. Furthermore, since electric current does not flow to the circuit connected to fuel cell 1 when the ON/OFF signal from load switch 19 is OFF, the unloaded state can be determined when the OFF signal from load switch 19 is input to controller 20.

First, at Step S11, it is determined whether or not there is a start-up request for the fuel cell system from the ON/OFF signal from main switch 15. If main switch 15 is ON, it is determined that a start-up request has been made and the process proceeds to Step S12. When the start-up takes place, fuel cell 1 is controlled so that the unloaded state is maintained. At Step S12, purge valve 8, which covers gas emission flow channel 2b that is connected to anode 1a of fuel cell 1, is closed. Next, at Step S13, hydrogen tank base valve 3 is opened and at Step S14, circulating pump 7 is operated. In this manner, exhaust anode gas is circulated to anode 1a through bypass flow channel 6.

The circulating pump operated at Step S14 circulates the exhaust anode gas so that the hydrogen supplied at Step S15 from hydrogen tank 2 via the opening in hydrogen supply control valve 5 does not flow into bypass flow channel 6 from hydrogen supply flow channel 2a.

At Step S15, hydrogen supply control valve 5 is opened and hydrogen is supplied to anode 1a from hydrogen tank 2. In this manner, hydrogen is supplied to anode 1a from hydrogen tank 2 after circulating pump 7 is operated to circulate the exhaust anode gas, the oxidant gas inside of anode 1a mixes with the hydrogen, and the mixture is sent to bypass flow channel 6 from gas emission flow channel 2b.

Next, at Step S16, the volume of exhaust anode gas that is circulated to anode 1a from circulating pump 7 is controlled. The volume of exhaust anode gas that is circulated to anode 1a is set according to the concentration of hydrogen in the gas mixture detected by concentration sensor 12 installed at the anode inlet. More specifically, the operating load of circulating pump 7 is feedback controlled so that the target ratio of the concentration of hydrogen supplied to anode 1a from hydrogen tank 2 and bypass flow channel 6 and the concentration of air from bypass flow channel 6 has a greater amount of hydrogen, for example a ratio of 7:3 for hydrogen versus oxidant gas (air).

Next, at Step S17, it is determined whether or not the amount of time elapsed since the supply of hydrogen began at Step S15 has reached a predetermined time. If the predetermined amount of time has elapsed, the process proceeds to Step S18, and if it has not elapsed, the process returns to Step S16 and the control of the circulating pump is repeated. At this step, the predetermined time is the amount of time required for the oxygen inside of anode 1a to be completely consumed due to its reaction with the hydrogen, and the predetermined time is calculated by estimating the amount of oxygen from the amount of hydrogen supplied to anode 1a and the target ratio (for example 7:3) between the concentration of the hydrogen supplied to anode 1a and the concentration of air and integrating the estimated amount of oxygen so that the integrated amount of oxygen is the maximum amount that can be present in the cubic volume of hydrogen supply flow channel 2a.

Next, at Step S18, it is determined that all of the oxygen in anode 1a has been consumed due to the fact that the predetermined time has elapsed, fuel cell 1 is started up, then purge valve 8 is opened at Step S19, and the process switches to normal operation. When fuel cell 1 is started up, electric current flows between the load and fuel cell 1 for the first time. Until fuel cell 1 is started up at Step S18, the fuel cell system is operated by means of a secondary battery or the like that is not shown in the drawing.

Next is provided an explanation of the method used to set the target ratio between the hydrogen concentration and air concentration in the gas mixture supplied to anode 1*a*. The hydrogen from the hydrogen tank and the gas mixture from the exhaust gas that circulated the bypass flow channel flow into the anode, but it has never been known what effect this gas mixture has on the deterioration of the fuel cell. Therefore, the inventor focused on the relationship between the ratio of concentration between the hydrogen and air (oxygen) in the gas mixture supplied to anode 1*a* and the carbon corrosion of cathode 1*b* and conducted experiments to confirm the conditions under which carbon corrosion of cathode 1*b* occurs when a gas mixture containing two different concentrations flowed into anode 1*a*.

Figure 4:
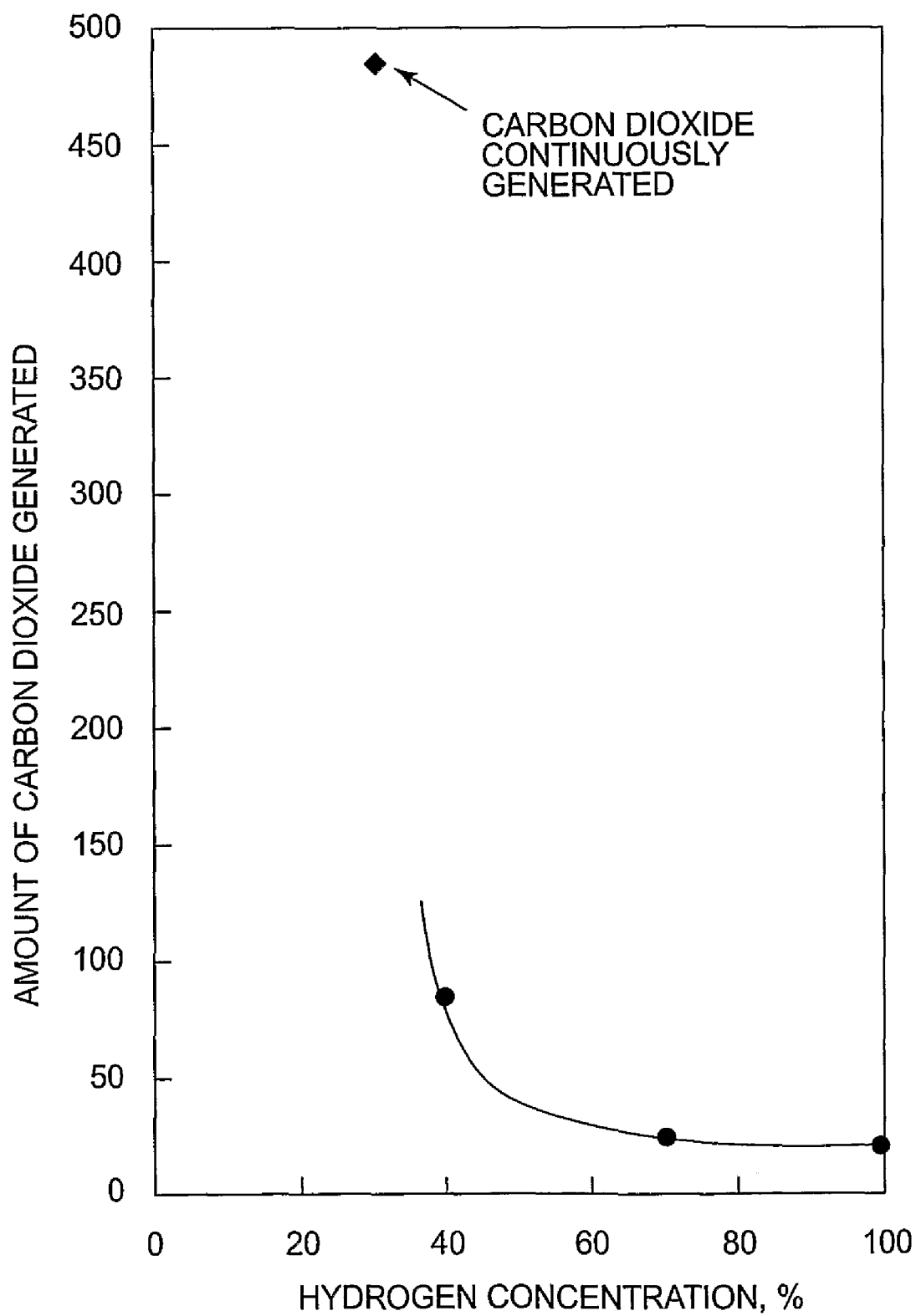
FIG. 4 presents measurement results of the generation of carbon dioxide caused by the carbon corrosion of the cathode when gas mixtures containing various ratios of hydrogen/air concentrations are introduced to the anode.

FIG. 4 shows the conditions under which carbon corrosion occurs in cathode 1*b* when a gas mixture with various different ratios of concentration of hydrogen and air is introduced to anode 1*a*. Carbon corrosion can be judged according to the amount of carbon dioxide that is generated when carbon corrosion occurs. The greater the amount of carbon dioxide, the more it is concluded that carbon corrosion has progressed.

The carbon dioxide that was generated when gas with a 100% concentration of hydrogen was introduced into anode 1*a* was temporarily generated when the boundary between the hydrogen that was supplied and the air inside of anode 1 passed through anode 1*a*. In addition, when a gas mixture consisting of a 70% concentration of hydrogen and a 30% concentration of oxygen was introduced into anode 1*a*, the amount of carbon dioxide generated did not change much in comparison to when a hydrogen concentration of 100% was introduced.

However, when a mixture of gas consisting of a 40% concentration of hydrogen and a 60% concentration of oxygen were introduced into anode 1*a*, the amount of carbon dioxide generated increased by 4 times in comparison to when a hydrogen concentration of 100% was introduced. Furthermore, when a gas mixture consisting of a 30% concentration of hydrogen and a 70% concentration of oxygen was introduced, it was discovered that carbon dioxide was continually generated. The dots shown in the drawing represent a plot of the amount of carbon dioxide generated during a 3-minute period after the supply of hydrogen is begun. Based on these results, it was discovered that by supplying a gas mixture that contained an hydrogen concentration of 70% or more to anode 1*a*, the carbon corrosion in cathode 1*b* could be suppressed.

Figure 5:
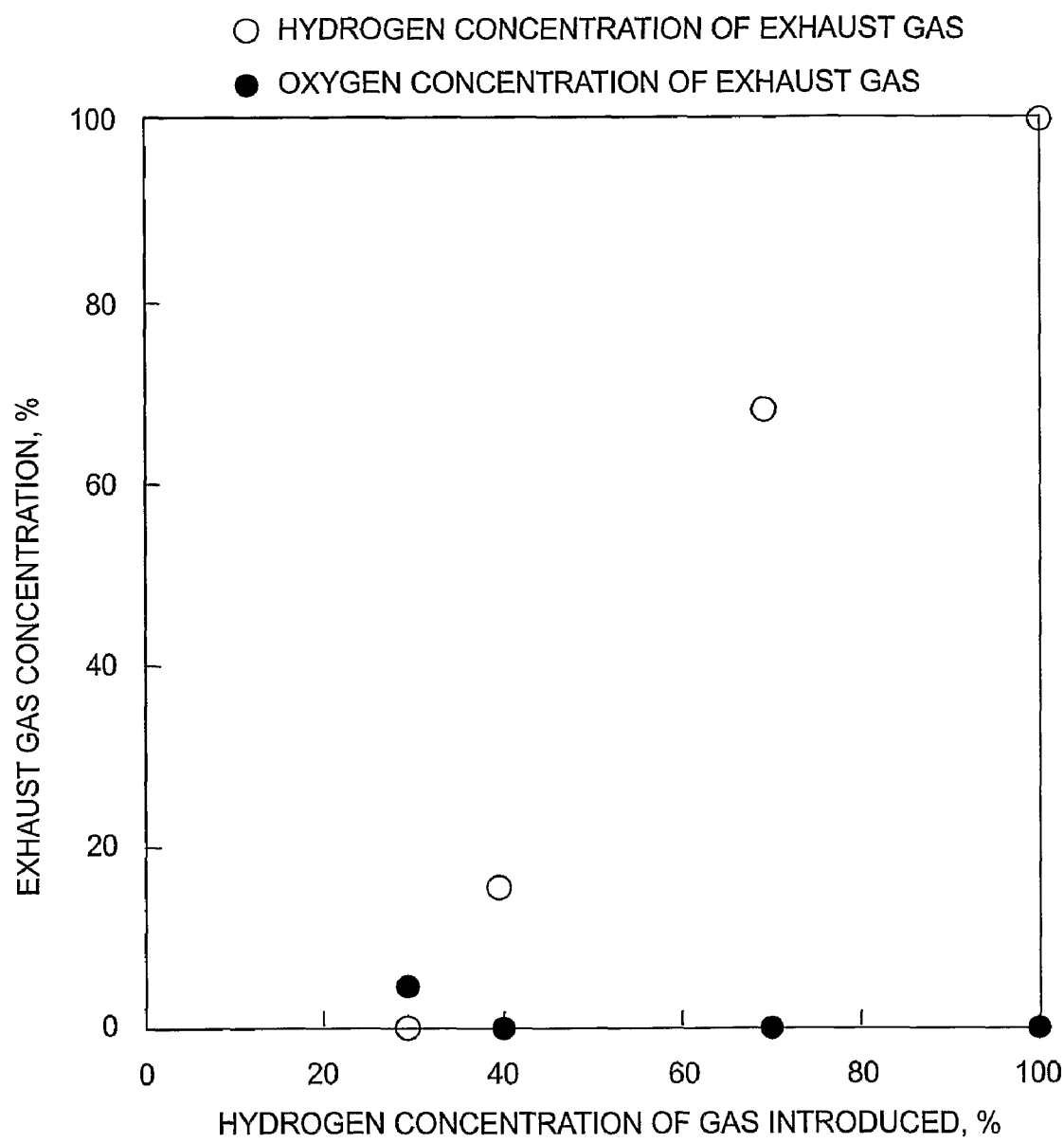
FIG. 5 presents investigation results of the hydrogen concentration or the oxygen concentration of the exhaust gas exhausted from the anode in relation to the hydrogen concentration of the gas mixture introduced to the anode.

FIG. 5 shows the results of the investigation pertaining to the hydrogen concentration and air concentration of the exhaust anode gas that was exhausted from anode 1*a* in relation to the hydrogen concentration of the gas mixture consisting of hydrogen and air that was introduced to anode 1*a*. According to the results shown in FIG. 5, when carbon dioxide is continually generated (a gas mixture consisting of a hydrogen concentration of 30%+an oxygen concentration of 70%), hydrogen is not included in the exhaust gas. Therefore, by controlling the gas mixture so that hydrogen is included in the exhaust anode gas, the continued generation of carbon dioxide, or in other words, the continued progression of carbon corrosion, can be controlled. On the other hand, by making the concentration of hydrogen in the gas mixture to be 30% or more, the concentration of oxygen in the exhaust anode gas becomes close to 0%, and the oxygen inside of anode 1*a* can be eliminated. In order to ensure that a sufficient amount of hydrogen is included in the exhaust anode gas that is exhausted from anode 1*a*, the hydrogen to oxygen volume ratio of the hydrogen in the gas mixture that is supplied should be 2.5 times or more.

Therefore, for the present embodiment, when the fuel cell system is started up and there is no oxidant gas present inside of anode 1*a* and no current flowing to the circuit connected to fuel cell 1 such that it is in the unloaded state, purge valve 8 is closed, circulating pump 7 is started up, hydrogen supply control valve 5 is opened while the exhaust anode gas exhausted from anode 1*a* has been circulated to bypass flow channel 6, and hydrogen is supplied to anode 1*a* from hydrogen tank 2. Then, circulating pump 7 is controlled so that the hydrogen concentration of the gas mixture consisting of hydrogen supplied to anode 1*a* and the exhaust anode gas reaches a predetermined value (for example, 70%) or more.

In this manner, the composition (concentration) of the gas that constitutes the gas mixture supplied to anode 1*a* is controlled, the carbon corrosion of cathode 1*b* can be suppressed, exhaust anode gas that contains hydrogen exhausted from anode 1*a* during the start-up can be circulated to anode 1*a* via bypass flow channel 6, and since the emission of wasted hydrogen is prohibited, a reduced power generation efficiency of the fuel cell system can be mitigated. Also, closing purge valve 8 upon start-up and then opening hydrogen supply control valve 5 after circulating pump 7 is started prevents the hydrogen from hydrogen tank 2 from back-flowing. In addition to using circulating pump 7 for controlling the hydrogen concentration of the gas mixture supplied to anode 1*a*, hydrogen supply control valve 5 may also be used.

Figure 6:
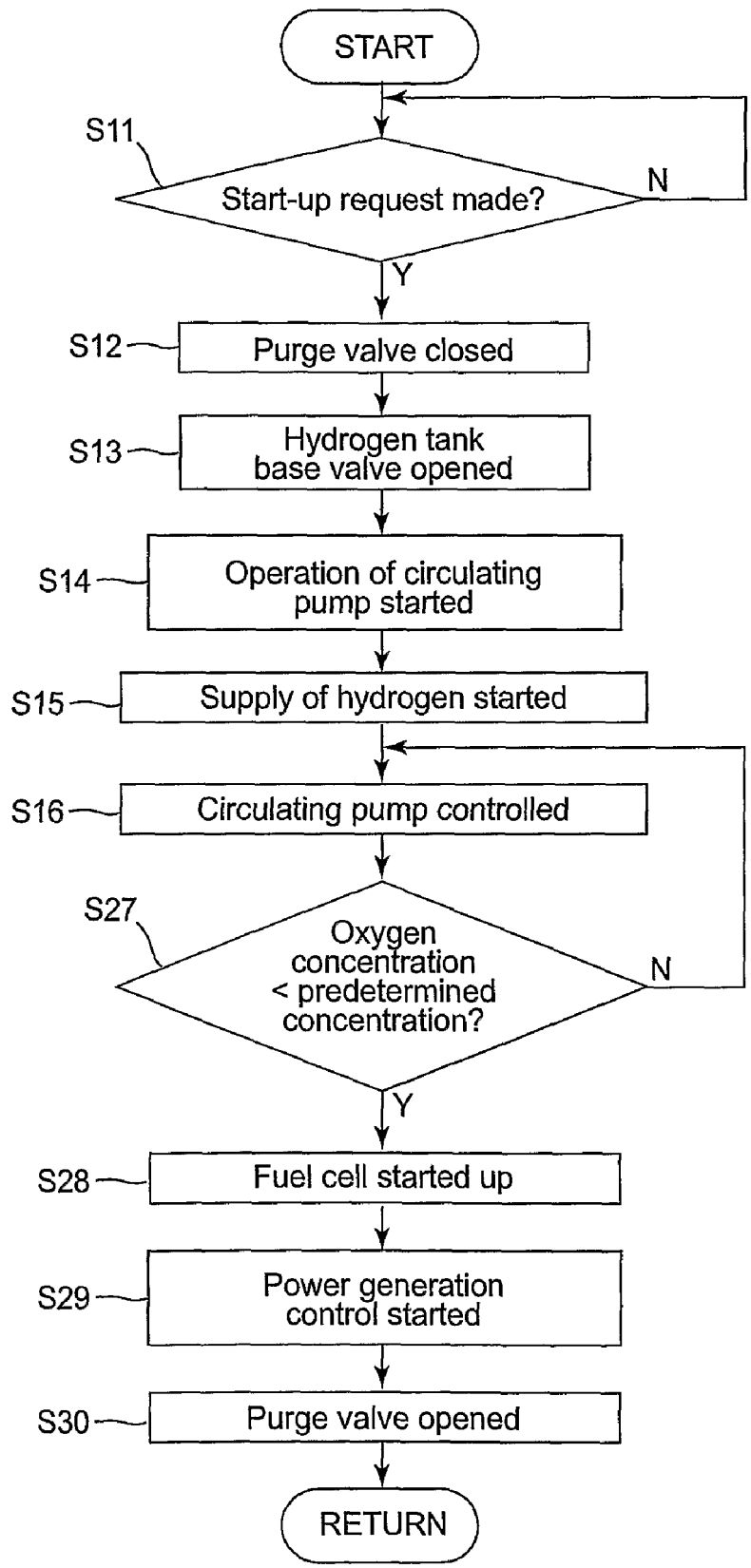
FIG. 6 is a flowchart for explaining the control process for Embodiment 2.

FIG. 6 is a flowchart for explaining the control process executed by controller 20 of Embodiment 2. The differences between the constitution of Embodiment 1 and Embodiment 2 are that for Embodiment 2, an oxygen concentration sensor that detects the concentration of oxygen in the gas mixture supplied to anode 1*a* is provided instead of hydrogen concentration sensor 12 that detects the concentration of hydrogen in the gas mixture supplied to anode 1*a*, but the rest of the constitution is the same. Next is provided an explanation of the differences between the contents of the control process for this embodiment, using the flowchart for Embodiment 1 as a comparison.

The contents of the control process for Steps S11 to S16 are the same as those for Embodiment 1. After Step S16, at Step S27, the oxygen concentration is read from the oxygen concentration sensor that has been newly installed, and it is determined whether or not the oxygen concentration that is detected is below the predetermined concentration. At this step, for example, if the predetermined concentration is set as 6% for when the oxidant gas remaining in anode 1*a* is air and the oxygen concentration detected is 6% or more, the operating load of circulating pump 7 is controlled by Step S16 so that it drops below 6%.

When the oxygen concentration is below the predetermined concentration, the process proceeds to Step S28 and beyond. At Step S28, fuel cell 1 is started up, at Step S29, the operating load of circulating pump 7 and the opening of hydrogen supply control valve 5 are controlled so that the amount of power generation of fuel cell 1 meets the operator's demand. At Step S30, purge valve 8 is opened and the residual nitrogen inside of anode 1*a* is emitted to the outside.

While the present embodiment provides the same effects as Embodiment 1, the time required for the purge control executed up to Step S30 can be shortened.

Furthermore, by providing both hydrogen concentration sensor 12 from Embodiment 1 and the oxygen concentration sensor from Embodiment 2, consideration can be given to the amount of nitrogen and vapor in the air and the ratio between the hydrogen concentration and the oxygen concentration can be more precisely controlled.

In addition, for Embodiments 1 and 2, the concentration sensor was installed at the anode inlet, but a concentration sensor that detects the carbon dioxide concentration can be installed at the cathode outlet. In this case, as shown in FIG. 12, since carbon dioxide is generated from the degradation of the carbon, the degradation of the carbon can be determined from the concentration of the carbon dioxide that is generated, and by controlling the operating load of circulating pump 7 so that this carbon dioxide is below the predetermined concentration, deterioration of the MEA can be prevented.

A concentration sensor that detects the oxygen concentration can also be installed at the anode outlet. In doing so, a gas mixture with a high concentration of oxygen can be supplied to anode 1a when circulating pump 7 is operated and air enters into bypass flow channel 6, even though air from the outside does not enter the fuel cell immediately after fuel cell 1 is stopped. When this type of gas mixture is supplied to anode 1a, oxygen that is not used for the chemical reaction that takes place inside of anode 1a gets generated, and the extra oxygen is exhausted to gas emission flow channel 2b. The concentration of this exhausted oxygen is detected by the sensor and the operating load of circulating pump 7 is set so that the oxygen concentration detected falls below the predetermined concentration.

Furthermore, the operating load of circulating pump 7 can be controlled by using the output value of voltage sensor 14 instead of hydrogen concentration sensor 12 in Embodiment 1. When an oxygen-rich gas mixture that has a high concentration of oxygen is supplied to anode 1a, the power generation voltage of fuel cell 1 decreases. Therefore, the voltage of the single cell that constitutes fuel cell 1, or the voltage for each of several predetermined single cells, is detected by means of voltage sensor 14. When the amount of change in the voltage reaches a predetermined amount of change or more, the amount of discharge from circulating pump 7 is decreased in order to supply a gas mixture with a high concentration of hydrogen.

Below is provided a detailed explanation. The relationship between the open circuit voltage and the hydrogen concentration/air concentration in the gas mixture was investigated by focusing on the relationship between the open circuit voltage of fuel cell 1 and the concentration of the gas mixture supplied to anode 1a. As a result, when 100% hydrogen or a gas mixture of a 70% concentration of hydrogen+a 30% concentration of oxygen was introduced to anode 1a, the open circuit voltage rose from 0V (V=volts and the same is true hereafter) to 0.9V or more and subsequently stabilized. On the other hand, when a gas mixture consisting of a 40% concentration of hydrogen and a 60% concentration of oxygen was introduced to anode 1a, a phenomenon occurred in which the voltage temporarily dropped to 0.9V, and when this happened, the generation of carbon dioxide was confirmed. In addition, when a gas mixture consisting of a 30% concentration of hydrogen and a 70% concentration of oxygen was introduced to anode 1a, the open circuit voltage did not stabilize, and therefore did not exceed 0.9V. Therefore, by controlling the operating load of circulating pump 7 so that the open circuit voltage did not drop below 0.9V when the gas mixture was introduced to anode 1a, the carbon corrosion of cathode 1b could be controlled. At this point, in order to ensure that the open circuit voltage does not even temporarily drop below 0.9V, the hydrogen to oxygen volume ratio of the hydrogen in the gas that is supplied should be 10 times or more.

Figure 7:
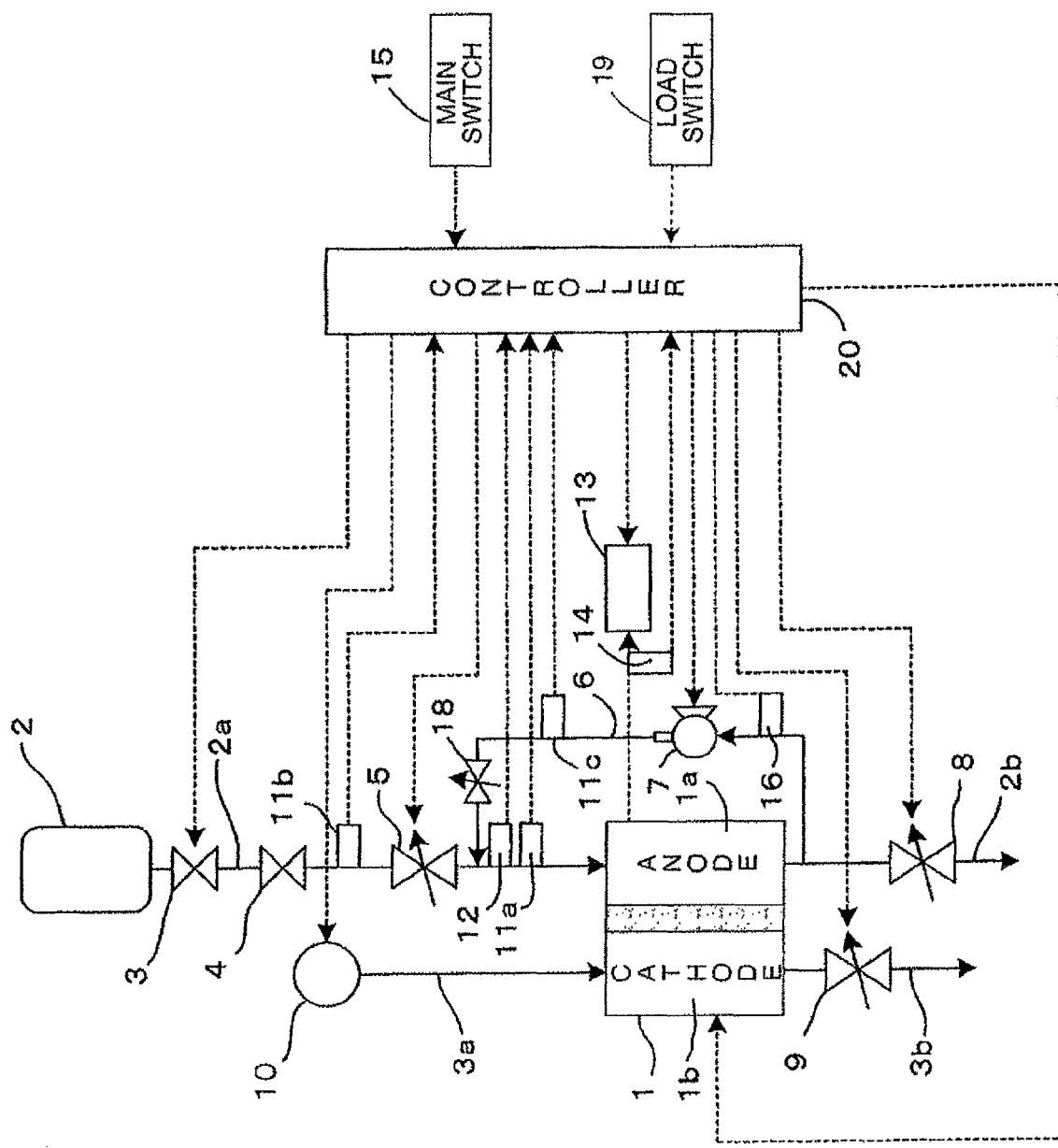
FIG. 7 is a block diagram of Embodiment 3.

FIG. 7 shows the constitution of Embodiment 3. The distinguishing constitution of this embodiment is that oxygen concentration sensor 16 for detecting the oxygen concentration is installed upstream (on the side at which gas emission flow channel 2b is located) of circulating pump 7 on bypass flow channel 6, circulation volume control valve 18 for controlling the circulation volume of the exhaust anode gas in the bypass flow channel is installed downstream (on the side at which hydrogen supply flow channel 2a is located) of circulating pump 7, and third pressure sensor 11c that detects the pressure inside of bypass flow channel 6 is installed on the bypass flow channel between circulation pump 7 and circulation volume control valve 18. The output from sensors 11c and 16 is output to controller 20 and circulation volume control valve 18 is controlled by controller 20 based on the output from sensors 11c and 16.

Figure 8:
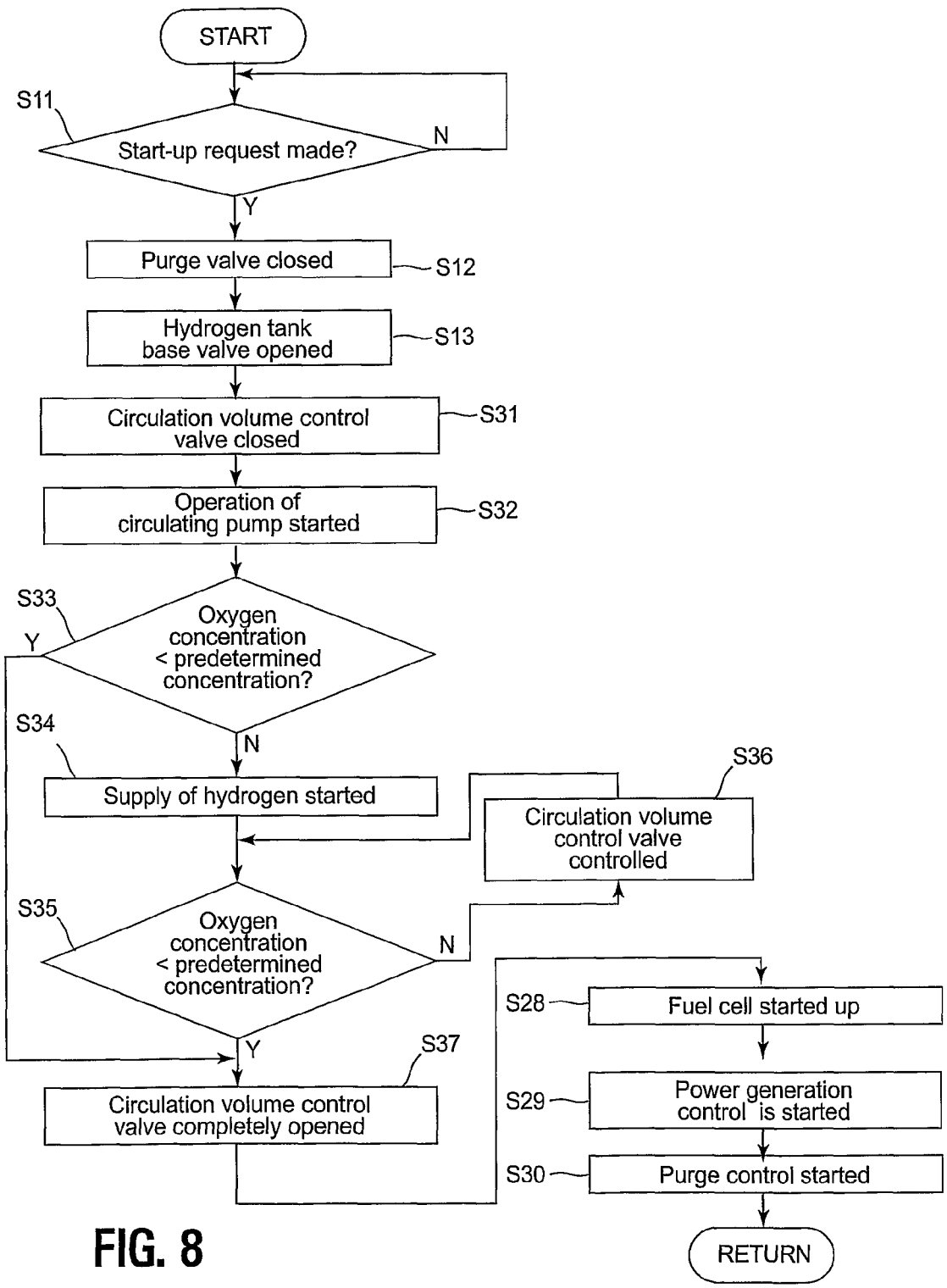
FIG. 8 is a flowchart for explaining the control process for Embodiment 3.

FIG. 8 is a flowchart for explaining the control process executed by controller 20 of this embodiment. Steps S11 to S13 are the same as those for the control process used in Embodiments 1 and 2, so further explanation has been omitted.

After hydrogen tank base valve 3 is opened at Step S13, next at Step S31, circulation volume control valve 18 installed on bypass flow channel 6 is closed. By closing circulation volume control valve 18, hydrogen can be prevented from flowing to bypass flow channel 6 from hydrogen supply flow channel 2a. Next, at Step S32, circulating pump 7 is operated. In doing so, the pressure in bypass flow channel 6 located between circulation volume control valve 18 and circulating pump 7 rises. At this point, the pressure in bypass flow channel 6 that is detected by third pressure sensor 11c is higher than the pressure in hydrogen supply flow channel 2a detected by first pressure sensor 11a.

Next, at Step S33, the value detected by oxygen concentration sensor 16 is used to determine whether or not the concentration detected is below the predetermined concentration. For this step, the predetermined concentration is the value for which it can be determined that the oxygen concentration in the exhaust anode gas has become sufficiently low, or for example, 6%. If it is below the predetermined value, it is determined that the concentration of oxygen in the exhaust anode gas is sufficiently low and the process proceeds to Step S37. If the concentration is above the predetermined value, the process proceeds to Step S34.

At Step S34, hydrogen supply control valve 5 is opened a predetermined amount, and supply of hydrogen from hydrogen tank 2 to anode 1a is begun. Next, at Step S35, the oxygen concentration in the exhaust anode gas is re-detected using oxygen concentration sensor 16, and the oxygen concentration detected is compared with the predetermined concentration used at Step S33 to determine whether or not it is below the predetermined concentration. If the detected concentration is below the predetermined concentration, the process proceeds to Step S37, if it is above the predetermined concentration, the process proceeds to Step S36, and at Step S36, circulation volume control valve 18 is used to control the volume of exhaust anode gas circulated so that the oxygen concentration falls below the predetermined concentration. At this point, circulating pump 7 is controlled so that the pressure upstream of circulation volume control valve 18 that rose at Step S32 does not drop.

At Step S37, it is determined that the oxygen concentration in anode 1a has become sufficiently low, so circulation volume control valve 18 is completely opened, and the process proceeds to Step S28 in order to switch to normal operation. Steps S28 to S30 are the same as that for the control process used in Embodiment 2.

For the present embodiment, in order to control circulation volume control valve 18 to control the volume of exhaust anode gas that circulates through bypass flow channel 6 so that the oxygen concentration in anode 1a becomes sufficiently low enough, the circulation volume can be promptly changed to correspond with the changes in the volume of hydrogen supplied even when the amount of hydrogen supplied to anode 1a changes quickly.

In addition, when supplying hydrogen when the fuel cell system is started up, initially, the pressure in anode 1a is low and at a much different level than the base pressure of hydrogen tank 2 (or the pressure downstream of depressurizing valve 4), so the volume of hydrogen supplied is greater. As the supply of hydrogen continues, the pressure in anode 1a rises so the volume of hydrogen supplied becomes smaller. On the other hand, if the responsiveness of circulating pump 7 is poor, the supply of air is not timely enough at the onset of the supply of hydrogen. Therefore, for Embodiment 3, before the hydrogen supply process is executed at Step S34, circulation volume control valve 18 is closed and circulating pump 7 is operated in order to accumulate high-pressure air inside of bypass flow channel 6 located between circulating pump 7 and circulation volume control valve 18 so that a large volume of air can be supplied even immediately after the supply of hydrogen is carried out, causing the air to react more quickly and be consumed.

In addition, for Embodiment 3, oxygen concentration sensor 16 was used to measure the concentration of air (oxygen) inside of the hydrogen supply flow channel immediately following start-up (Step S35), but the concentration of air can be estimated by measuring the time required from the previous stop of the fuel cell until a start-up request is received from the operator. Because the air that enters hydrogen supply flow channel 2a enters by means of natural dispersion, it is time-dependent, which makes estimation of the volume of air possible. For the purposes of this embodiment, the stop of the fuel cell means that the drawing of electric power has stopped and the purge valve 8 is in the opened state.

Furthermore, the concentration of air can be estimated by the electric power consumed by circulating pump 7. By ensuring that the revolution speed of circulating pump 7 for immediately after the start-up is always constant at the start-up, the relationship between that revolution speed and the power consumption can be detected. If the concentration of air in the exhaust anode gas that is circulated is high, a great deal of power is consumed, and if the concentration of hydrogen is high, then the power consumption is small, so this tendency can be used to estimate the concentration of air.

Figure 9:
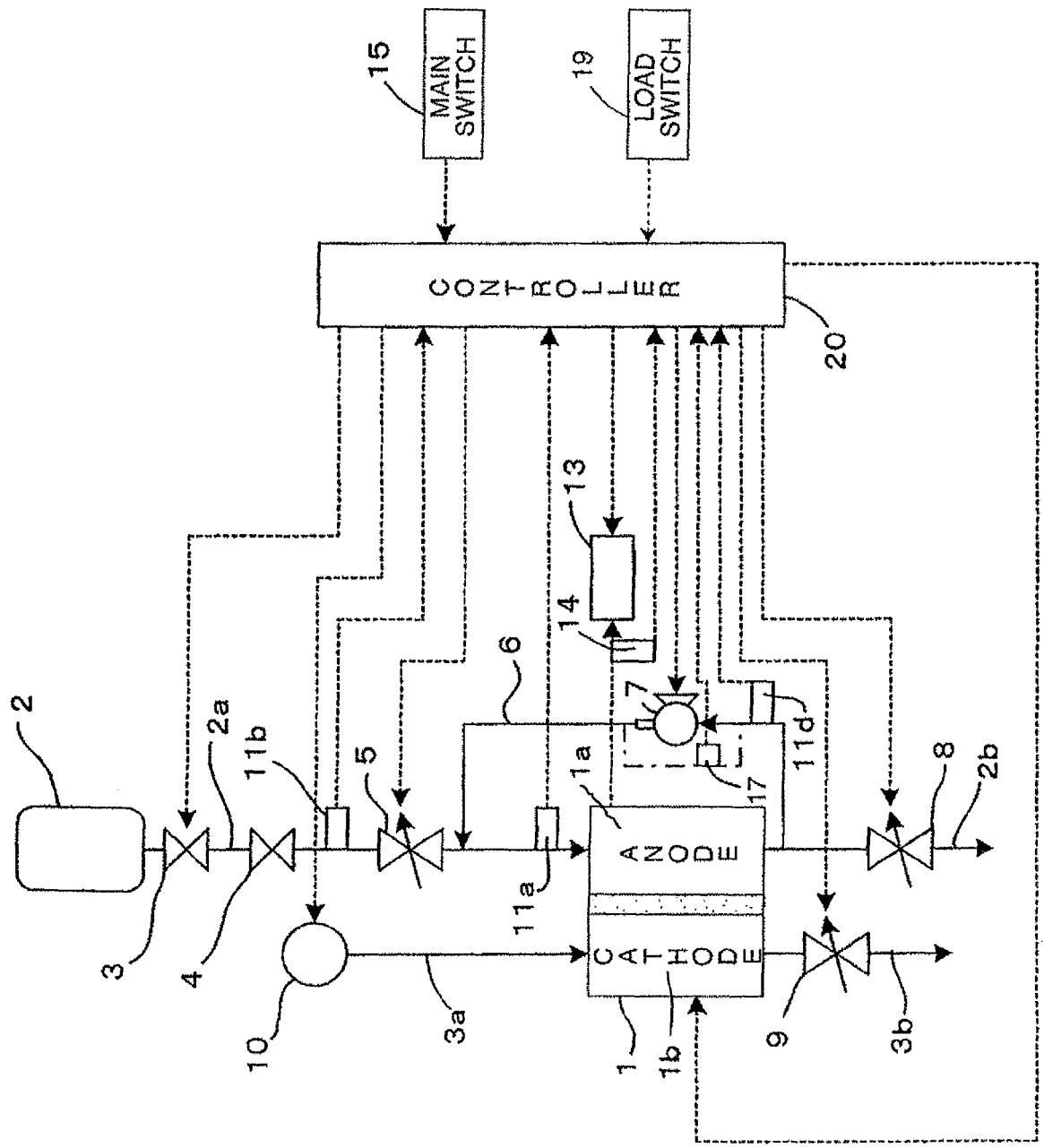
FIG. 9 is a block diagram of Embodiment 4.

FIG. 9 shows the constitution of Embodiment 4. Compared to the constitution of Embodiment 1, Embodiment 4 is characterized in that it is equipped with differential pressure sensor 17 for detecting the difference in pressures upstream and downstream of circulating pump 7, and fourth pressure sensor 11d provided upstream of differential pressure sensor 17. The output signals from sensors 17 and 11d are sent to controller 20.

Figure 10:
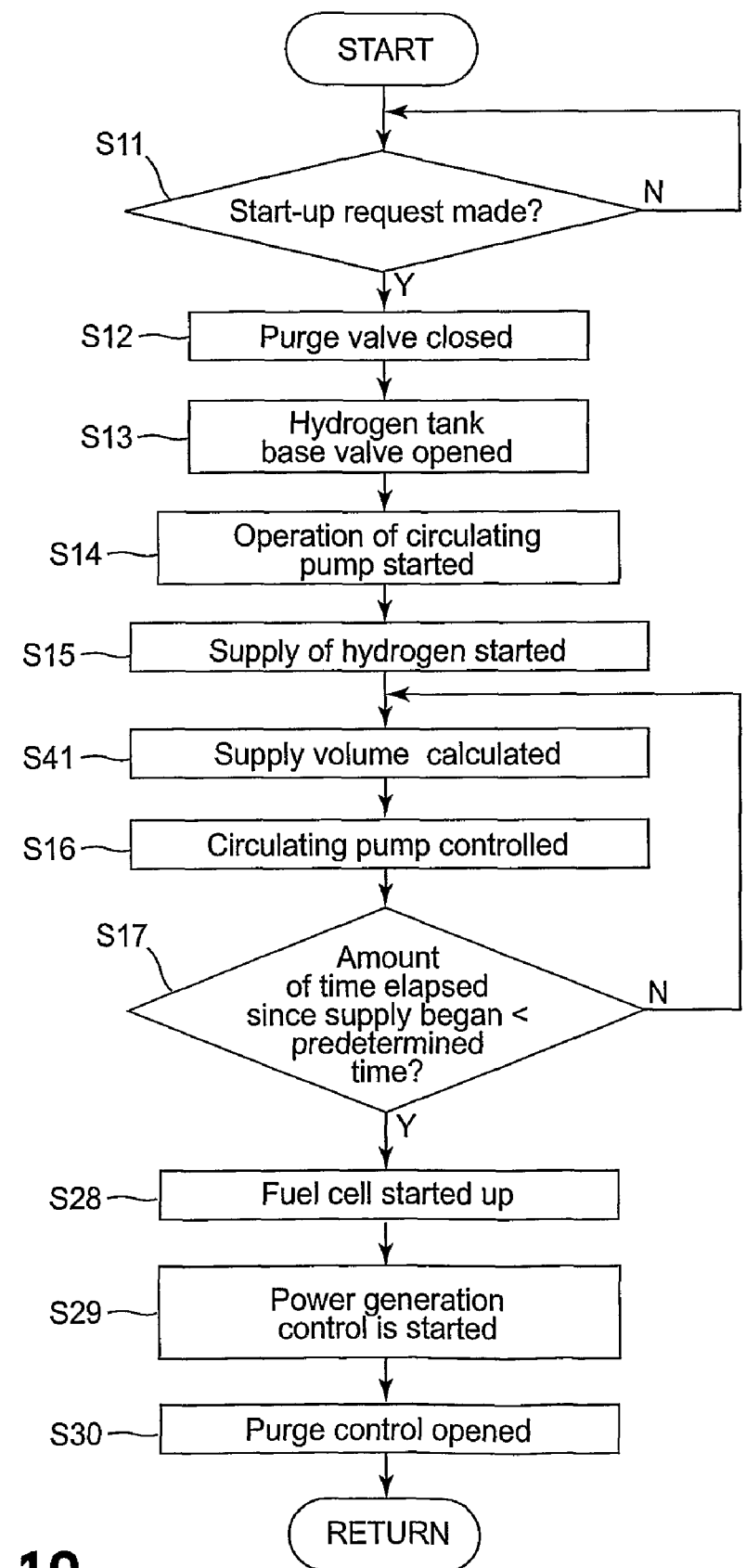
FIG. 10 is a flowchart for explaining the control process for Embodiment 4.

FIG. 10 is a flowchart for explaining the control process for the present embodiment. Steps S11 to S15 are the same as those for the control process used in Embodiments 1 and 2, so further explanation has been omitted.

At Step S41, the volume of hydrogen supplied to anode 1a is calculated. The calculation of the hydrogen supply volume is executed by first and second pressure sensors 11a and 11b that detect the pressure at the upstream and downstream sides of hydrogen supply control valve 5. Further, the flow rate of the exhaust anode gas that is circulated to anode 1a from bypass flow channel 6 is calculated according to the hydrogen supply volume that is calculated. The flow rate of the exhaust anode gas that is circulated is controlled by the discharge rate of circulating pump 7 so that it is 30% or less of the hydrogen supply volume that is calculated. The target discharge rate for circulating pump 7 is decided according to the values detected by the sensors that are installed, differential sensor 17 and fourth pressure sensor 11d, and the performance of circulating pump 7. For the purposes of this embodiment, flow rate means the mass flow rate. For the present embodiment, although various types of sensors were used to perform the control process, the target discharge rate of circulating pump 7 can be set by estimating the pressure drop in the flow channel through which the hydrogen flows or in fuel cell 1, instead of using sensors.

Figure 11:
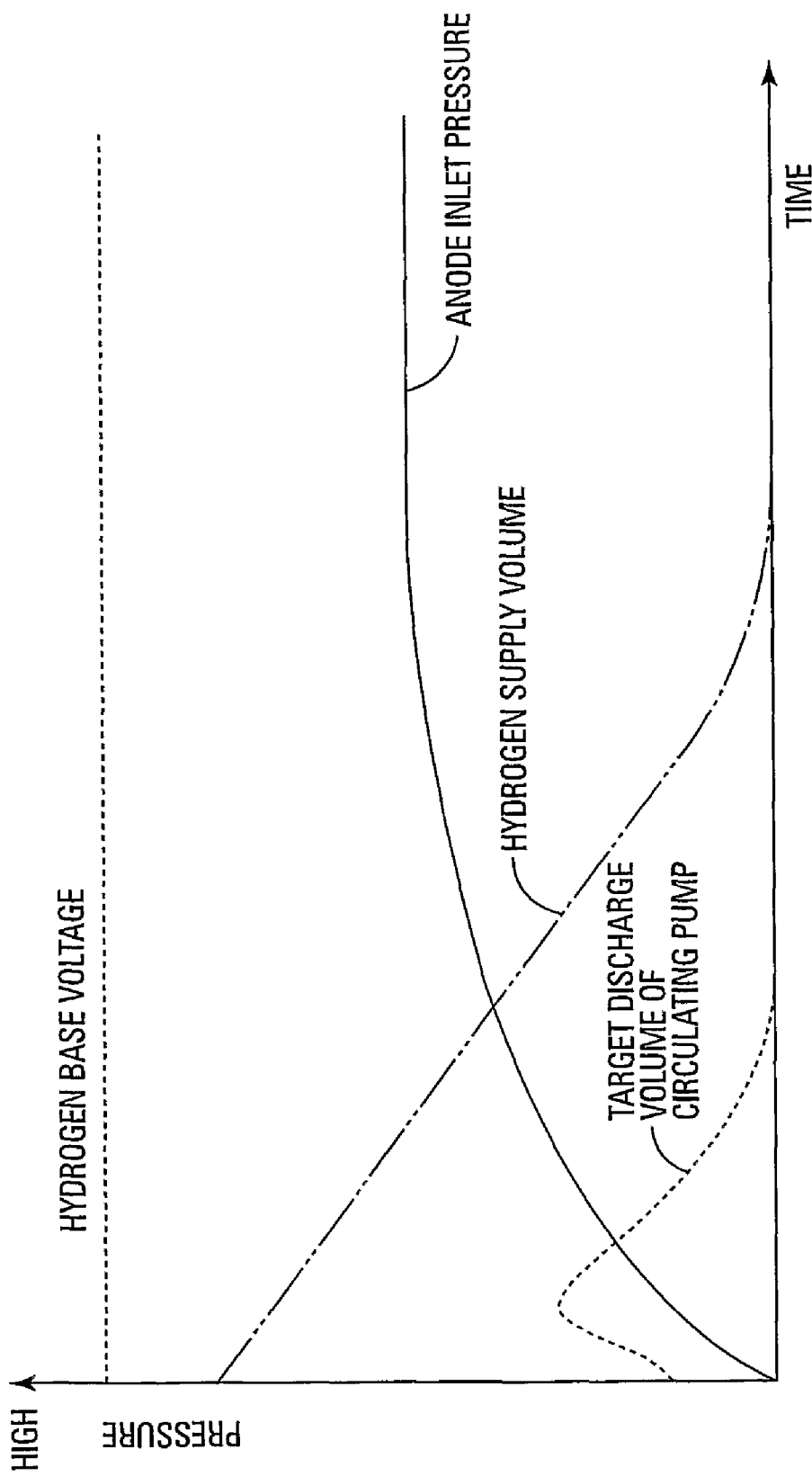
FIG. 11 is a state diagram for explaining the state of the fuel cell.

As shown in FIG. 11, the hydrogen supply volume has a tendency to decrease as the pressure at the anode inlet rises, so the discharge rate of circulating pump 7 is controlled in accordance with this tendency.

For this embodiment, the volume of the hydrogen that is supplied is calculated from the pressure differences between the front and rear of hydrogen supply control valve 5. By setting the flow rate in which the exhaust anode gas circulates to anode 1a from bypass flow channel 6 according to the hydrogen supply volume that is calculated, the hydrogen flow rate at the anode inlet and the flow rate of the exhaust anode gas can be controlled to prevent carbon corrosion, without detecting the concentration of gas, such as hydrogen and the air.

For the embodiments described thus far, circulating pump 7 was installed for circulating the exhaust anode gas through bypass flow channel 6, but an ejector may also be provided that supplies hydrogen into bypass flow channel 6, instead of performing variable control of the flow rate of circulating pump 7.

Figure 13:
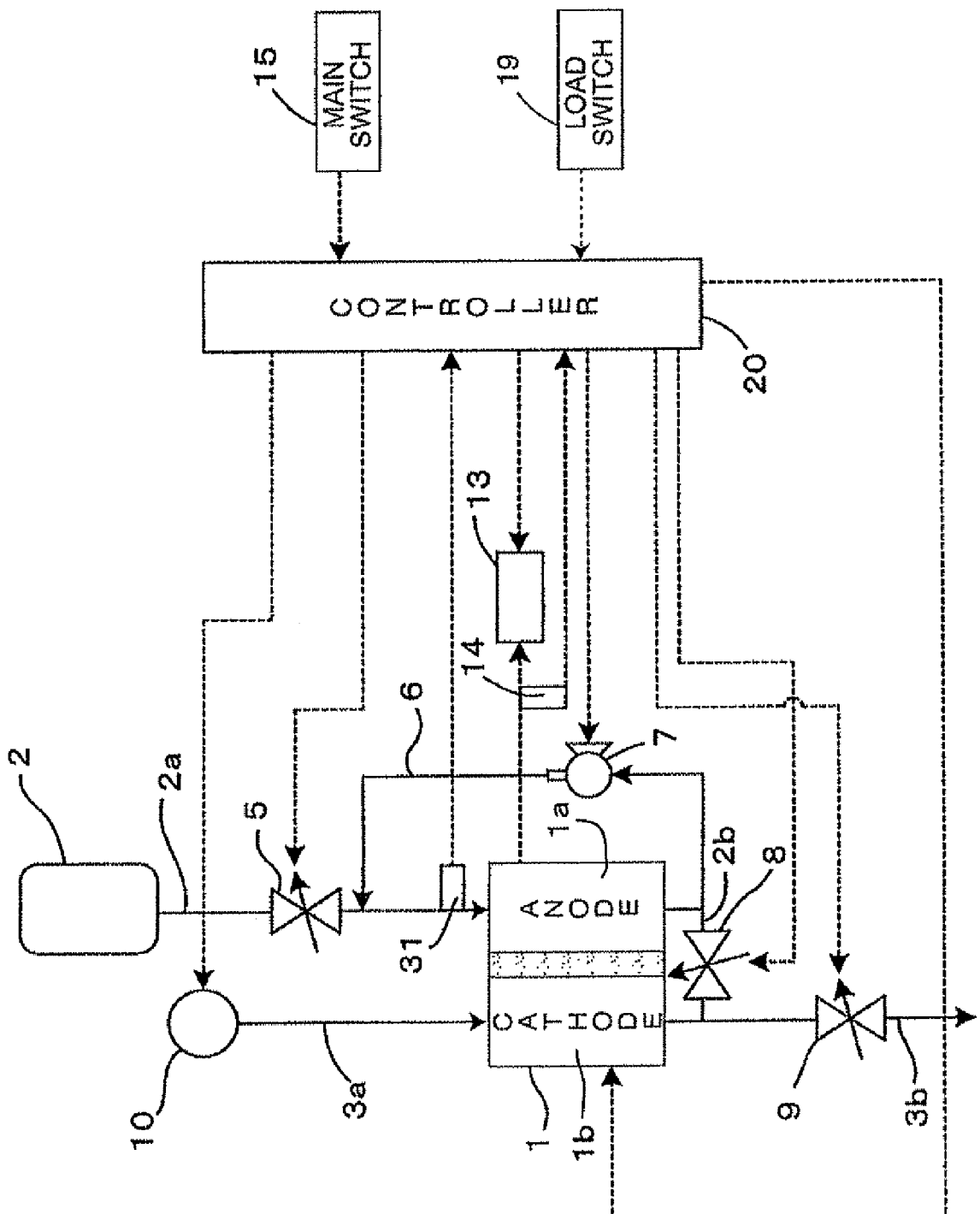
FIG. 13 is a block diagram of Embodiment 5.

FIG. 13 shows the constitution for Embodiment 5. For this embodiment, compared to the constitution of Embodiment 1 shown in FIG. 1, the differences are that hydrogen concentration sensor 12 has been replaced with oxygen concentration sensor 31 and gas emission flow channel 2b merges upstream of air regulator 9 with air emission flow channel 3b at the downstream side of purge valve 8. In addition, hydrogen tank base valve 3, depressurizing valve 4, and first pressure sensor 11a have been deleted from the constitution.

The constitution of the present embodiment is characterized in that the flow rate of the exhaust anode gas that is circulated via bypass flow channel 6 is made to circulate to the anode at the maximum circulation volume for which stable control can be achieved.

Figure 14:
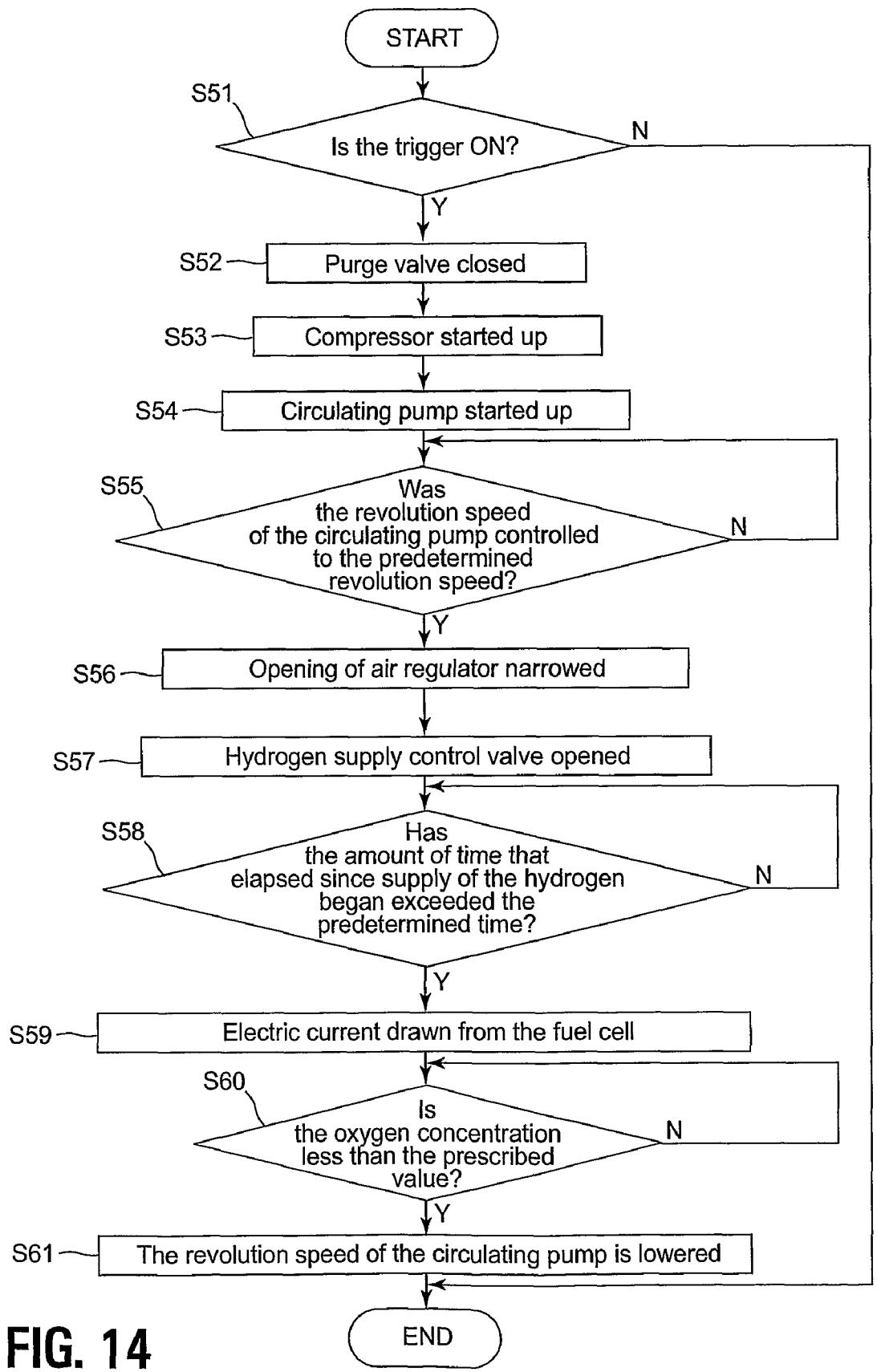
FIG. 14 is a flowchart for explaining the control process for Embodiment 5.

FIG. 14 is a flowchart for explaining the control process executed by controller 20 for starting up the fuel cell system according to the present embodiment. This start-up control is executed when start up is performed in the unloaded state in which oxidant gas (air) is present inside of anode 1a, hydrogen supply flow channel 2a, and bypass flow channel 6.

The oxidant gas present inside of anode 1a when fuel cell 1 is started up is the air that entered from the outside while the fuel cell was stopped or air that cross-leaked into anode 1a through the electrolyte membrane from cathode 1b.

In addition, for the present embodiment, the state for before the start-up control begins (in other words, when the fuel cell system is stopped) is the state in which the entire constitution is stopped. Also, the state in which purge valve 8 is open, hydrogen supply control valve 5 is closed, and air regulator 9 is open is explained below.

At Step S51, it is determined whether or not the trigger that determines the start up of the fuel cell system is ON. It is assumed that the trigger to determine the start up is the ON state of main switch 15, for example. If the trigger is ON, the process proceeds to Step S52, and if it is OFF, the control process ends. At Step S52, purge valve 8 is closed and the exhaust anode gas exhausted from the anode is circulated to the anode via bypass flow channel 6. Closing purge valve 8 ensures that the hydrogen supplied at Step S57 does not get emitted to the outside. Next, at Step S53, compressor 10 is started. Compressor 10 is controlled to a revolution speed that corresponds to the idle state as described below.

At Step S54, circulating pump 7 is started. At this step, the revolution speed for circulating pump 7 is controlled to the maximum revolution speed that can be controlled in a stable manner under normal operating conditions. At Step S55, the revolution speed of circulating pump 7 is detected by a revolution speed sensor (not shown in the drawing) and it is determined whether or not circulating pump 7 converged to the maximum revolution speed in a stable manner. If circulating pump 7 converged, the process proceeds to Step S56, and if circulating pump 7 did not converge, control is continued and the determination is repeated until it does converge. At Step S56, the opening of air regulator 9 is narrowed and pressurization inside of the cathode is begun. Then, at Step S57, hydrogen supply control valve 5 is opened and supply of hydrogen to the anode of fuel cell 1 is started.

At Step S58, it is determined whether or not the amount of time elapsed since the supply of hydrogen began has passed a predetermined time. At this step, the predetermined time is obtained in advance by means of experimentation or the like based on the estimated amount of time required for the hydrogen to get completely supplied to the anode, and the time that is obtained is used to establish the predetermined time. When the predetermined time has elapsed, the process proceeds to Step S59 and the drawing of electric current from fuel cell 1 begins. At this point, a minute amount of load current that corresponds to the idle state is drawn.

At Step S60, the output from oxygen concentration sensor 31 is read and it is determined whether or not the oxygen concentration detected has reached a predetermined value (for example, 6%) or less, and if it is 6% or less, the process switches to Step S61. Here, the value has been set as 6%, but it should be a concentration of 6% or less according to the deterioration experiment described below. At Step S61, the revolution speed of circulating pump 7 is lowered to a revolution speed that corresponds to the idle state, the start-up control for the present process is ended, and the process switches to normal operation. For this process, the revolution speed that corresponds with the idle state is the revolution speed at which the fuel cell system can generate power and is the revolution speed that takes place when in the idle state in which electric power is not being supplied to an external load.

For the present embodiment, the term maximum revolution speed was used for circulating pump 7, but needless to say, it is not limited to one revolution speed and includes revolution speeds that are in the vicinity of the maximum revolution speed. For example, in FIG. 15, the actual maximum revolution speed of circulating pump 7 is 12,000 rpm, but the maximum revolution speed used for explaining the present embodiment is defined as a range from 10,000-12,000 rpm.

Figure 15:
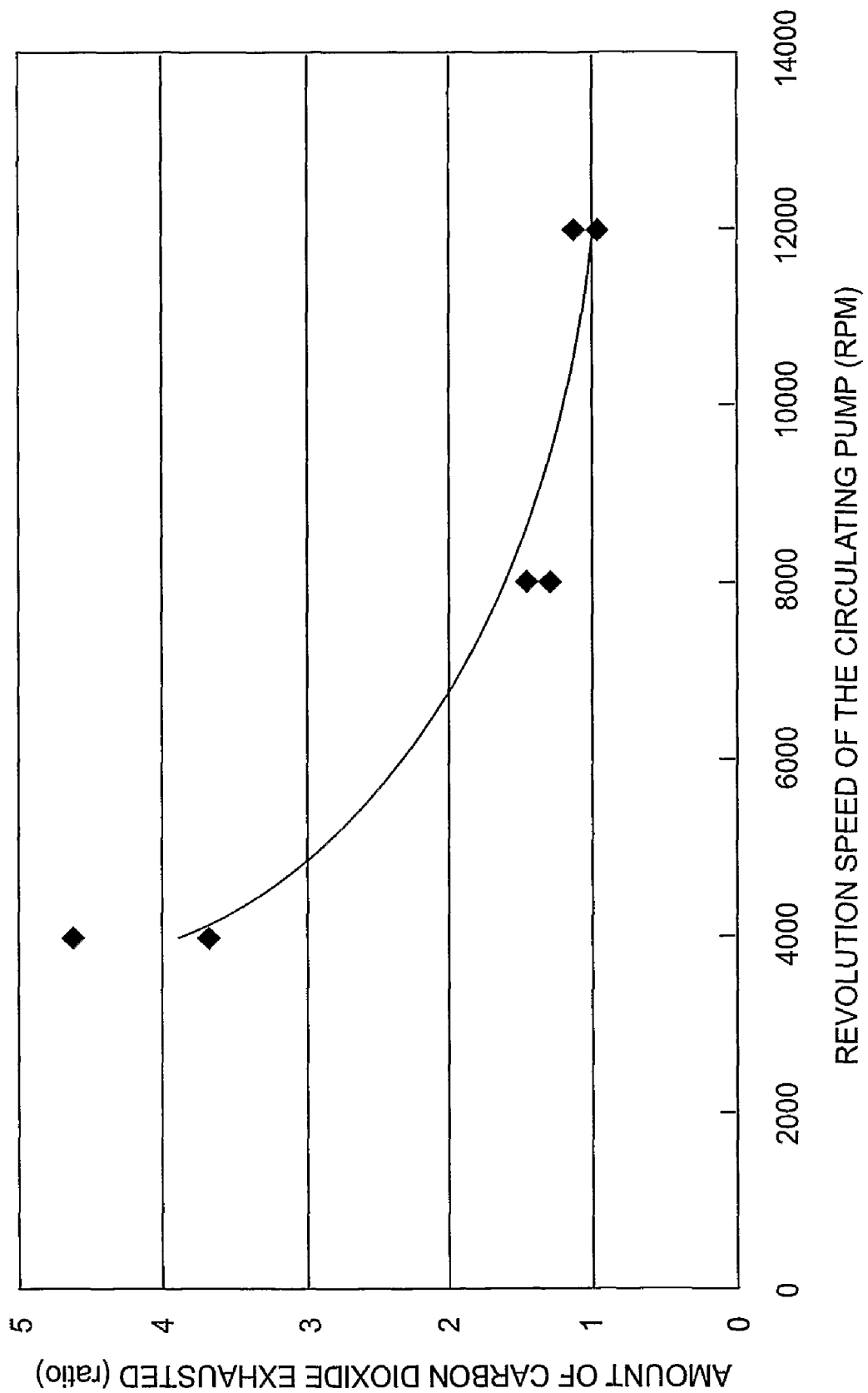
FIG. 15 is a diagram showing the relationship between the exhaust volume of carbon dioxide measured at the cathode outlet and the revolution speed of the circulating pump.

FIG. 15 shows the relationship between the exhaust volume of carbon dioxide measured at the cathode outlet and the revolution speed of circulating pump 7. This is the relationship between the amount of carbon dioxide exhausted from the cathode and the revolution speed of circulating pump 7 for when the revolution speed of circulating pump 7 is stably controlled to a predetermined revolution speed, hydrogen supply control valve 5 is open, pressurization of the hydrogen has started, and hydrogen has been supplied to the anode of fuel cell 1.

As a result, air was made to flow to the cathode of fuel cell 1 at a steady rate, and the amount of carbon dioxide (excluding the $CO_2$ when the air was supplied) that was exhausted in the air exhausted from the cathode was measured by the gas analyzer installed at the cathode outlet.

When only the revolution speed of circulating pump 7 was changed to 4,000, 8,000 and 12,000 rpm and the rest of the conditions for the experiment remained the same, it was discovered that when the revolution speed of circulating pump 7 was increased, the amount of carbon dioxide exhausted from the cathode outlet was significantly reduced. This exhaust of carbon dioxide is believed to be due to carbon corrosion that takes place in the cathode, as shown in the formula below. In other words, by increasing the revolution speed of circulating pump 7, the amount of hydrogen (exhaust anode gas) containing air that is circulated increases, the residual air in the anode is quickly consumed, and the carbon corrosion that occurs in the cathode is suppressed, resulting in a reduced amount of carbon dioxide exhaust.

$$C+2H_2O \rightarrow CO_2+4H^++4e^- \qquad (3)$$

Figure 16:
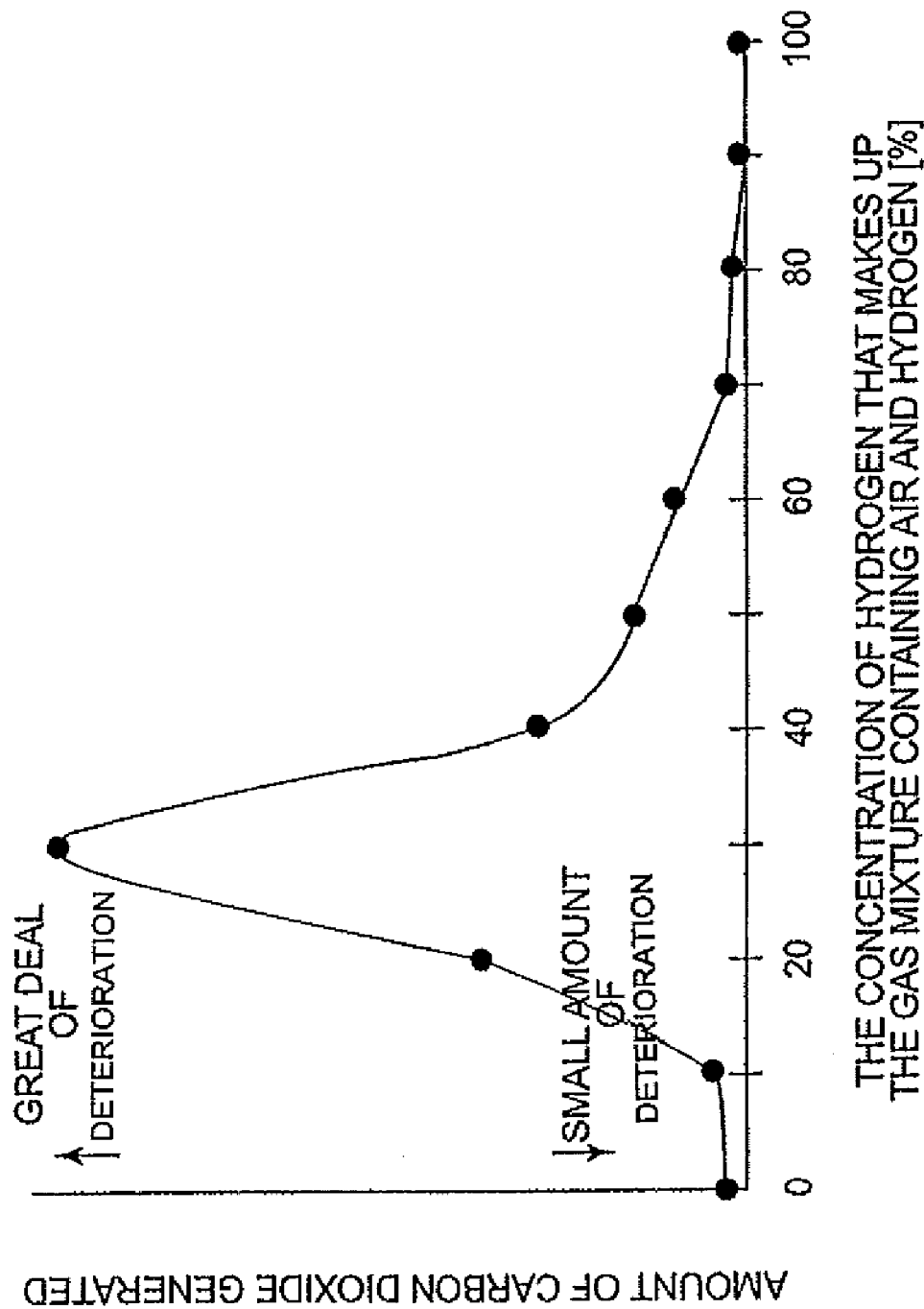
FIG. 16 presents measurement results of the volume of carbon dioxide in the air exhausted from the cathode.

FIG. 16 shows the results of the measurement of the amount of carbon dioxide in the air exhausted from the cathode (exhaust cathode gas) for when air is supplied at a steady rate to the cathode of the single cell that constitutes fuel cell 1, as well as when a gas mixture containing hydrogen and air mixed in a predetermined ratio is supplied to the anode.

Based on the results, the amount of carbon dioxide exhausted from the cathode changes greatly depending on the concentration ratio of hydrogen/air supplied to the anode, and exhaust of carbon dioxide was confirmed for a range of hydrogen/air=10/90%70/30%, and it was discovered that for a hydrogen concentration of 70% or more, the exhaust of carbon dioxide was approximately zero. Since a concentration ratio of hydrogen/air=70/30% is equivalent to hydrogen/nitrogen/oxygen=70/24/6%, a predetermined value of 6% is established for the oxygen concentration in Step S60. The generation of the carbon dioxide is the same reaction mechanism as Formula (3), and it is used as the index for the cathode deterioration. In addition, although the oxygen concentration was used to determine the exhaust of the carbon dioxide for the present embodiment, the hydrogen concentration can be used instead of the oxygen concentration to make the determination.

At the start-up phase before the supply of hydrogen begins, it is possible that oxygen is present in the anode of fuel cell 1, hydrogen supply flow channel 2a, which is the hydrogen supply pathway, and bypass flow channel 6. When hydrogen is supplied in such a state, a gas mixture in which hydrogen and oxygen coexist gets circulated into the anode, hydrogen supply flow channel 2a and bypass flow channel 6. This gas mixture is circulated to the anode as exhaust anode gas via bypass flow channel 6, which may accelerate the oxidation degradation of the cathode (corrosion of the carbon carrier itself, elution of the catalyst metal, or particle growth). Therefore, for the present embodiment, by supplying hydrogen to the anode at the maximum circulation volume that is feasible for a fuel cell system, the residual oxygen is quickly consumed in a short amount of time due to the combustion reaction that takes place at the anode and the oxidation degradation that takes place at the cathode, as represented by Formula (3), can be suppressed to a minimum.

Furthermore, by setting the revolution speed of circulating pump 7 in a range that is in the vicinity of the maximum revolution speed and that can be controlled in a stable manner, the residual oxygen is quickly consumed in a short amount of time due to the combustion reaction that takes place at the anode and the oxidation degradation of the cathode can be suppressed by means of a simple control process.

In addition, after the hydrogen is introduced, at the point at which the oxygen concentration in the vicinity of the anode and inside the hydrogen supply flow channel is less than a predetermined concentration, which is close to zero, the oxidation degradation reaction that takes place at the cathode can be suppressed, so there is no problem in reducing the circulation volume from the standpoint of the cathode deterioration. Therefore, the motive power of circulating pump 7 can be reduced and the power consumption can be curtailed.

Figure 17:
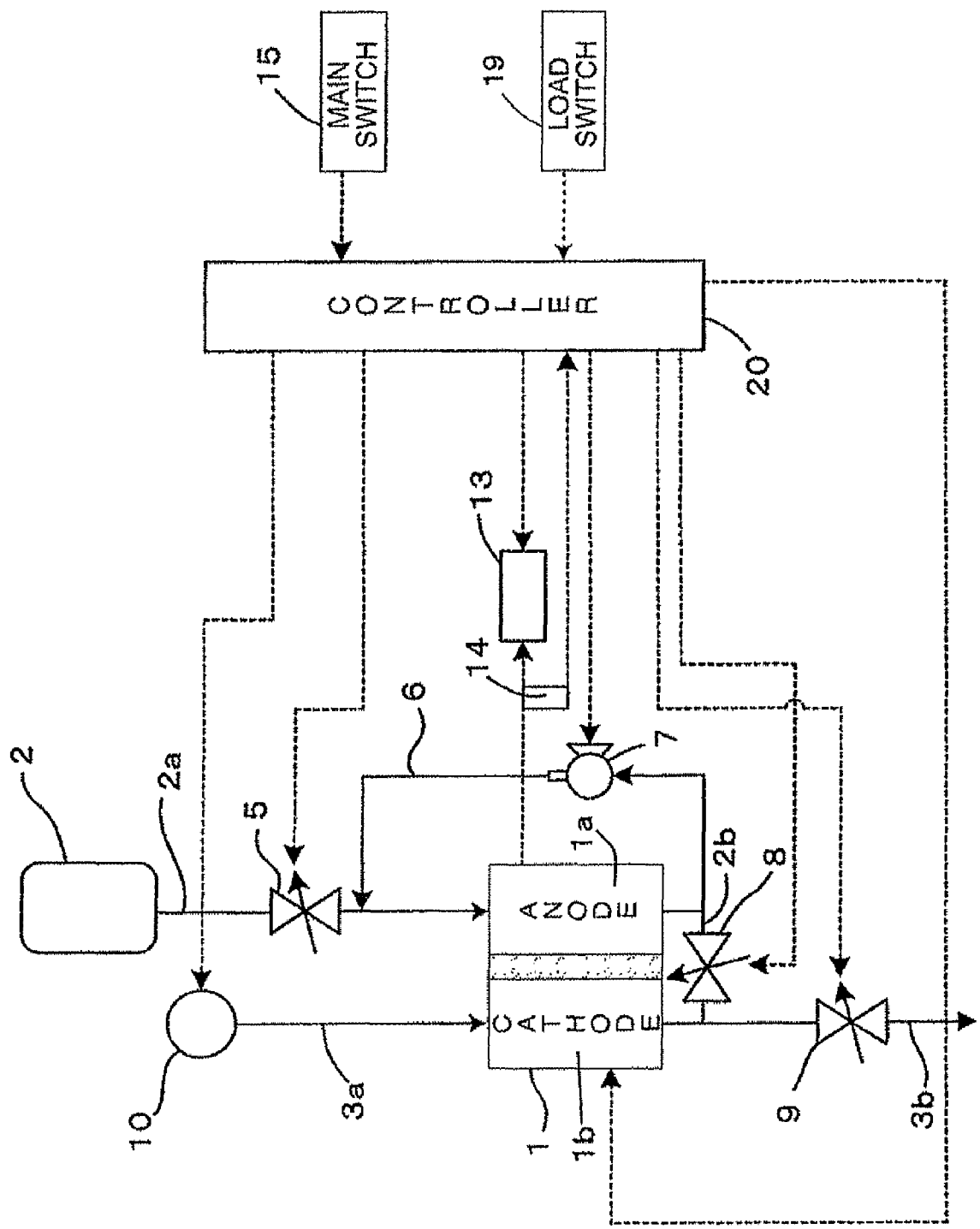
FIG. 17 is a block diagram of Embodiment 6.

FIG. 17 shows the constitution of Embodiment 6. Compared to the constitution of Embodiment 5 shown in FIG. 13, this embodiment differs in that the oxygen concentration sensor 31 has been eliminated. Instead of detecting the oxygen concentration, the oxygen concentration is obtained in advance by means of experimentation or the like based on the amount of time required from the time at which the supply of hydrogen starts until the predetermined oxygen concentration is reached, and when the predetermined time is reached, the start-up control is ended and the process switches to normal operation.

Figure 18:
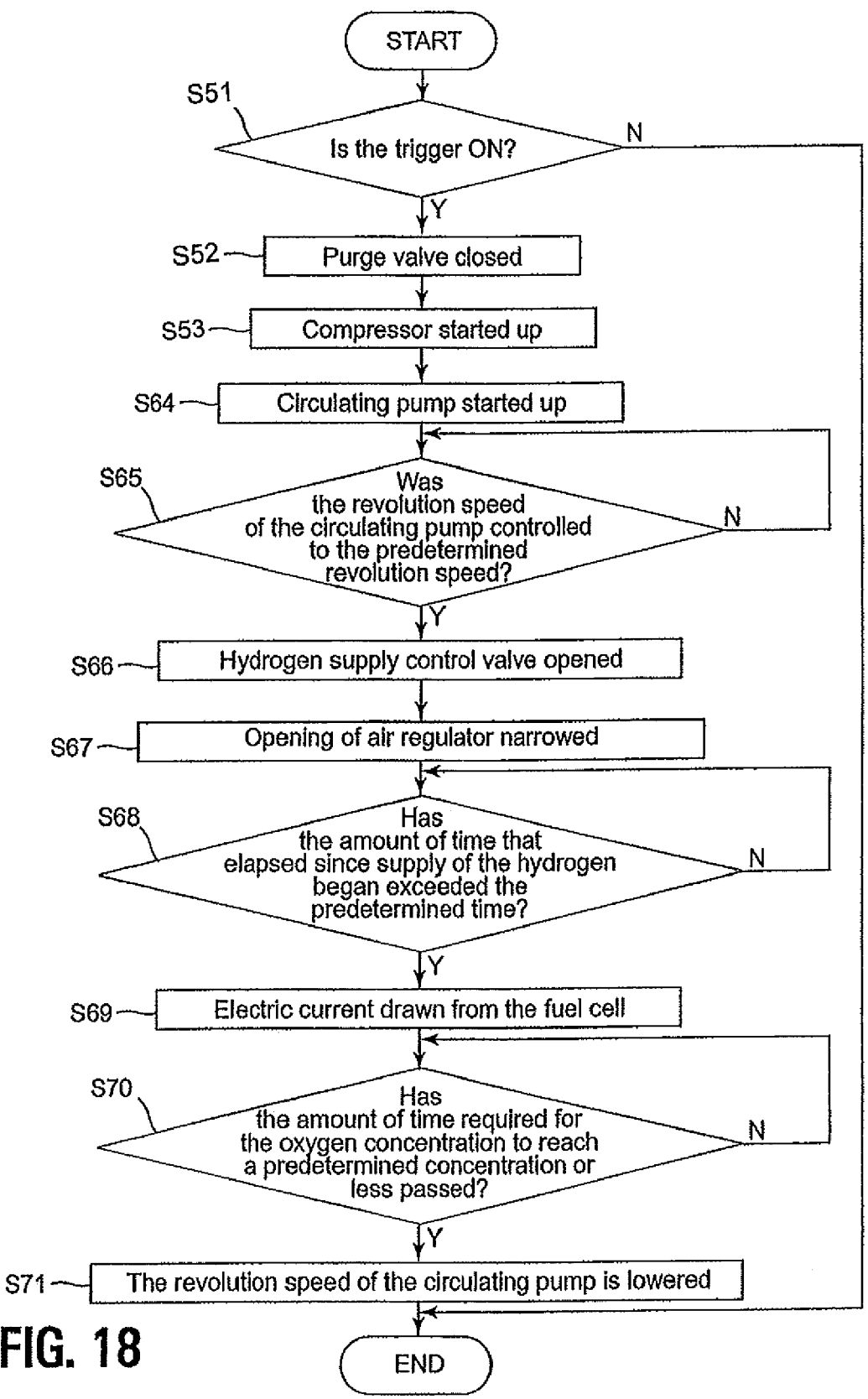
FIG. 18 is a flowchart for explaining the control process for Embodiment 6.

FIG. 18 is a flowchart for explaining the control process executed by controller 20 for starting up the fuel cell system for the present embodiment. This start up control is executed when start up is performed in the unloaded state in which oxidant gas (air) is present inside of anode 1a, hydrogen supply flow channel 2a and bypass flow channel 6. The contents of the control for Steps S51 through S53 are the same as those for Embodiment 5, so further explanation has been omitted.

At Step S64, circulating pump 7 is started. At this step, the rate of change (rate of increase) of the revolution speed of circulating pump 7 for when circulating pump 7 reaches the predetermined revolution speed as described below from the stopped state is controlled to approximately the maximum controllable rate of change. At Step S65, it is determined whether or not the revolution speed of circulating pump 7 has exceeded the maximum revolution speed that can be controlled in a stable manner under normal operating conditions and has been controlled to the predetermined revolution speed. The predetermined revolution speed of circulating pump 7 used in this embodiment is a higher revolution speed than the maximum revolution speed that can be controlled in a stable manner under normal operating conditions referred to in Embodiment 5. Therefore, the circulation volume of the gas mixture that consists of hydrogen and oxygen for this embodiment can be made larger than the circulation volume for Embodiment 5.

Figure 19:
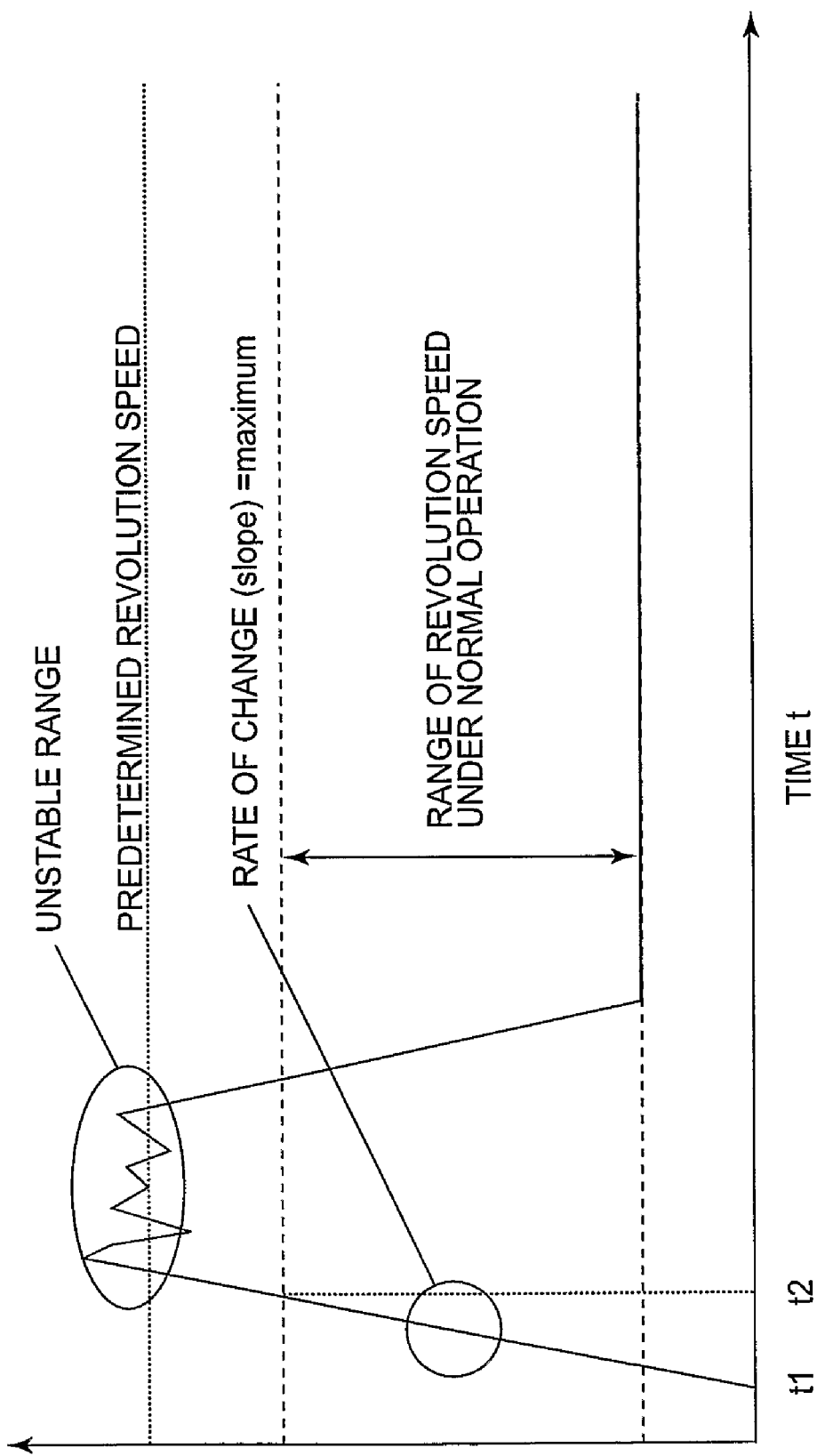
FIG. 19 is a diagram showing one example of the operating conditions for the circulating pump.

One example of the operating conditions for circulating pump 7 in Embodiment 6 is shown in FIG. 19. At time t1, circulating pump 7 starts up and the revolution speed is increased at the maximum rate of change. At time t2, the maximum revolution speed at a range of normal operating conditions is exceeded and an unstable range in which control cannot be performed is reached. A range of normal operating conditions is the range in which the revolution speed can be controlled in a stable manner, and the maximum revolution speed of Embodiment 5 means the maximum revolution speed of this range of normal operating conditions. The revolution speed of circulating pump 7, which has reached an unstable range, lacks stability in terms of control, but is controlled so that it reaches the predetermined revolution speed, and the discharge volume of circulating pump 7 at this point is greater than the maximum discharge volume under the normal range.

At Step S66, hydrogen supply control valve 5 is opened, the pressure of the hydrogen in the hydrogen supply flow channel is pressurized, and the supply of hydrogen to the anode is started. Then, at Step S67, the opening of air regulator 9 is narrowed and the air pressure inside the cathode is pressurized. At this point, control is executed so that the pressurization time required to pressurize the air and the hydrogen that is in a state of atmospheric pressure to a predetermined pressure is the shortest possible time.

At Step S68, it is determined whether or not the amount of time elapsed since the supply of hydrogen began has passed a predetermined time. At this step, the predetermined time is established as the predicted time required for hydrogen to get completely supplied to the anode. When the predetermined time has elapsed, the process proceeds to Step S69, and fuel cell 1 begins to draw electric current. At this point, a minute amount of load current that corresponds to the idle state is drawn.

At Step S70, it is determined whether or not the time elapsed since the supply of hydrogen began at Step S66 exceeds the predetermined time required for the residual oxygen inside the anode to get consumed. For this step, the time in which the concentration of the residual oxygen in the anode reaches 6% or less is the predetermined time. When the time elapsed exceeds the predetermined time, the process proceeds to Step S71, the revolution speed of circulating pump 7 is lowered to the revolution speed that corresponds with the idle state, and the control process is ended.

For the present embodiment, as was the case for Embodiment 5, by executing this type of start-up control and introducing the hydrogen (exhaust anode gas) to the anode in a circulation volume that can be realized by a fuel cell system, the residual oxygen can be quickly consumed in a short amount of time due to the combustion reaction that takes place at the anode, and the oxidation degradation of the cathode as represented by Formula (3) can be suppressed to a minimum.

In addition, by operating circulating pump 7 at a higher revolution speed than the maximum revolution speed for normal operating conditions that can be controlled in a stable manner and supplying the hydrogen to the anode, a greater amount of hydrogen can be supplied to the anode by means of a simple control process, so the residual oxygen is quickly consumed in an even shorter amount of time due to the combustion reaction that takes place at the anode, and the oxidation degradation at the cathode as represented by Formula (3) can be suppressed even further.

In addition, when the revolution speed of circulating pump 7 is increased to the predetermined revolution speed, and the rate of change of that revolution speed is controlled to approximately the maximum rate of change within the controllable range, the revolution speed can be increased to the predetermined revolution speed in a short amount of time.

Furthermore, by controlling the pressurization time until the hydrogen pressure reaches the predetermined pressure so that it becomes the shortest possible controllable time, a greater amount of fuel gets supplied to the anode of fuel cell 1 in a short amount of time, so the residual oxygen and hydrogen quickly generate a combustion reaction at the anode in a short amount of time and the oxygen is consumed. Therefore, the oxidation degradation of the cathode shown in Formula (3) can be suppressed.

In addition, since it is estimated that the oxygen concentration has been reduced to a predetermined reduction due to the fact that time has elapsed since the supply of hydrogen started, there is no need to install a concentration sensor, and attempts can be made to lower the cost of the system.

Figure 20:
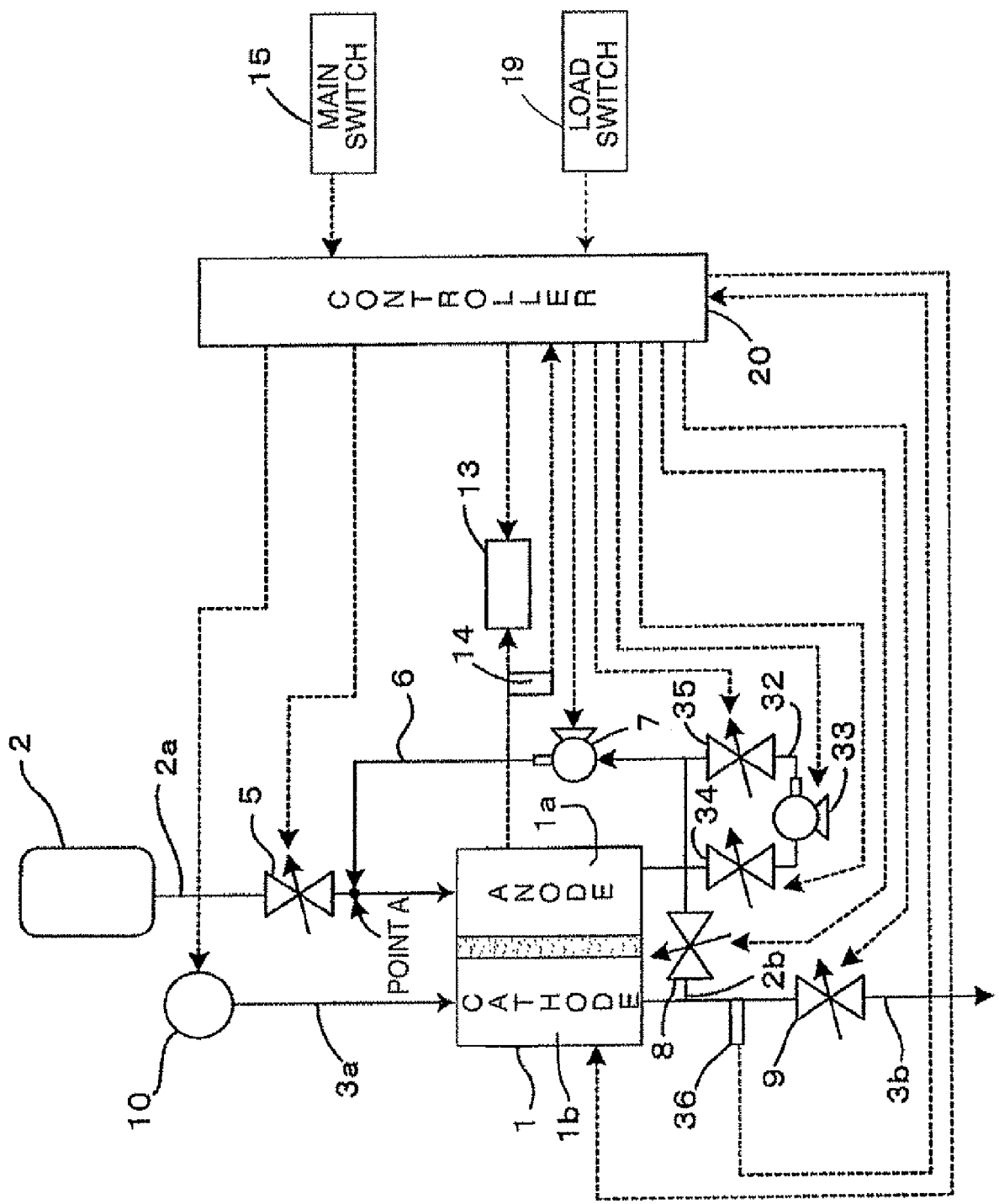
FIG. 20 is a block diagram of Embodiment 7.

FIG. 20 shows the constitution of Embodiment 7. Compared to the constitution of Embodiment 5 shown in FIG. 13, the present embodiment is different in that oxygen concentration sensor 31 has been omitted, concentration sensor 36 for detecting the concentration of carbon dioxide in the gas exhausted from the cathode is installed on air release flow channel 3b, and second bypass flow channel 32 is provided so as to bypass at a portion that is upstream of circulating pump 7 on bypass flow channel 6. Installed on second bypass flow channel 32 are auxiliary circulating pump 33 and control valves 34 and 35, which are upstream and downstream of auxiliary pump 33. The output from concentration sensor 36 is input to controller 20, and auxiliary circulating pump 33 and control valves 34 and 35 are controlled by controller 20. For the present embodiment, two circulating pumps, 7 and 33, cooperate to increase the amount of circulation and control the deterioration of the cathode.

Figure 21:
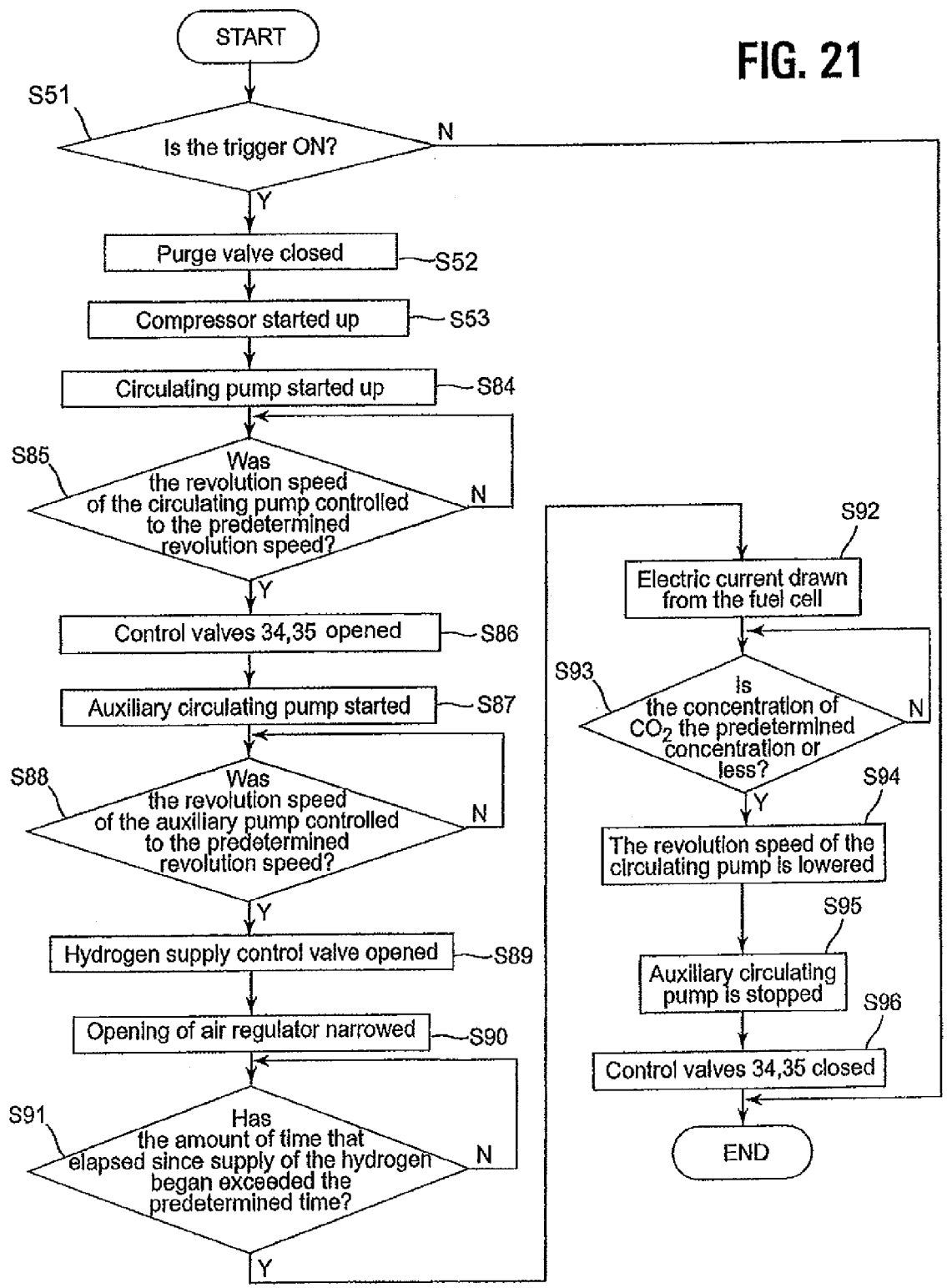
FIG. 21 is a flowchart for explaining the control process for Embodiment 7.

FIG. 21 is a flow chart for explaining the control process executed by controller 20 when starting up the fuel cell system for the present embodiment. This start-up control is the control that is executed when in the unloaded state, or when oxidant gas (air) is present inside of anode 1a, hydrogen supply flow channel 2a and bypass flow channel 6. The contents of the control for Steps S51 through S53 are the same as those for Embodiment 5, so further explanation has been omitted.

Next, at Step S84, circulating pump 7 is operated. The rate of change (rate of increase) of the revolution speed of circulating pump 7 is controlled at a maximum controllable rate of change. At Step S85, it is determined whether or not the revolution speed of circulating pump 7 has exceeded the maximum controllable revolution speed and has been controlled to the predetermined revolution speed. If it has been controlled, the process proceeds to Step S86. For the purposes of the present embodiment, the predetermined revolution speed of circulating pump 7 is controlled in the same manner as the control executed in Embodiment 6, and because of this, the amount of discharge from circulating pump 7 is greater than that of Embodiment 5.

At Step S86, control valves 34 and 35 installed upstream and downstream of auxiliary circulating pump 33, are opened, and at Step S87, auxiliary circulating pump 33 is operated. At this point, the rate of change (rate of increase) of the revolution speed of auxiliary circulating pump 33 is controlled at approximately a maximum controllable rate of change, just as was the case with circulating pump 7. In addition, the revolution speed of auxiliary circulating pump 33 also lacks stability in terms of control, just as was the case with circulating pump 7, but is controlled so that it reaches a predetermined revolution speed that is higher than the maximum revolution speed that is controllable and stable.

Then, at Step S88, it is determined whether or not the revolution speed of auxiliary circulating pump 33 has exceeded the maximum controllable revolution speed and has been controlled to the predetermined revolution speed. If it has been controlled, the process proceeds to Step S89, and at Step S89, hydrogen supply control valve 5 is opened, the pressure of the hydrogen in the hydrogen supply flow channel is pressurized, and supply of hydrogen to the anode is started.

Further, at Step S90, the opening of air regulator 9 is narrowed and the air pressure in the cathode is pressurized. At this point, the pressurization time until the pressure of the air and the hydrogen, which is in an atmospheric pressure state, is pressurized to the predetermined pressure is controlled so that it is the shortest possible time.

At Step S91, it is determined whether or not the amount of time elapsed since the supply of hydrogen began has exceeded the predetermined time. Here, the predetermined time is established as the predicted time required for the hydrogen to get completely supplied to the anode. When the predetermined time has elapsed, the process proceeds to Step S92, and the drawing of electric current from fuel cell 1 is started. At this point, a minute amount of load current that corresponds to the idle state is drawn.

At Step S93, the value detected by concentration sensor 36 is read and it is determined whether or not the concentration of carbon dioxide has reached the predetermined concentration or less. When it reaches the predetermined concentration or less (for example, 1%), it is determined that the concentration of carbon dioxide has been reduced to the lower limit and the process proceeds to Step S94. Immediately after hydrogen is supplied to the anode at Step S89, carbon dioxide is generated due to the carbon corrosion at the cathode. Then, once the oxygen in the hydrogen supply flow channel is consumed, the concentration of the carbon dioxide decreases and is converged to approximately 1%, which is the concentration of carbon dioxide in the air.

At Step S94, the revolution speed of circulating pump 7 is lowered to a revolution speed that corresponds with the idle state, and at Step S95, the operation of auxiliary circulating pump 33 is stopped. Then, at Step S96, control valves 34 and 35 are closed and the control process is ended.

Figure 22:
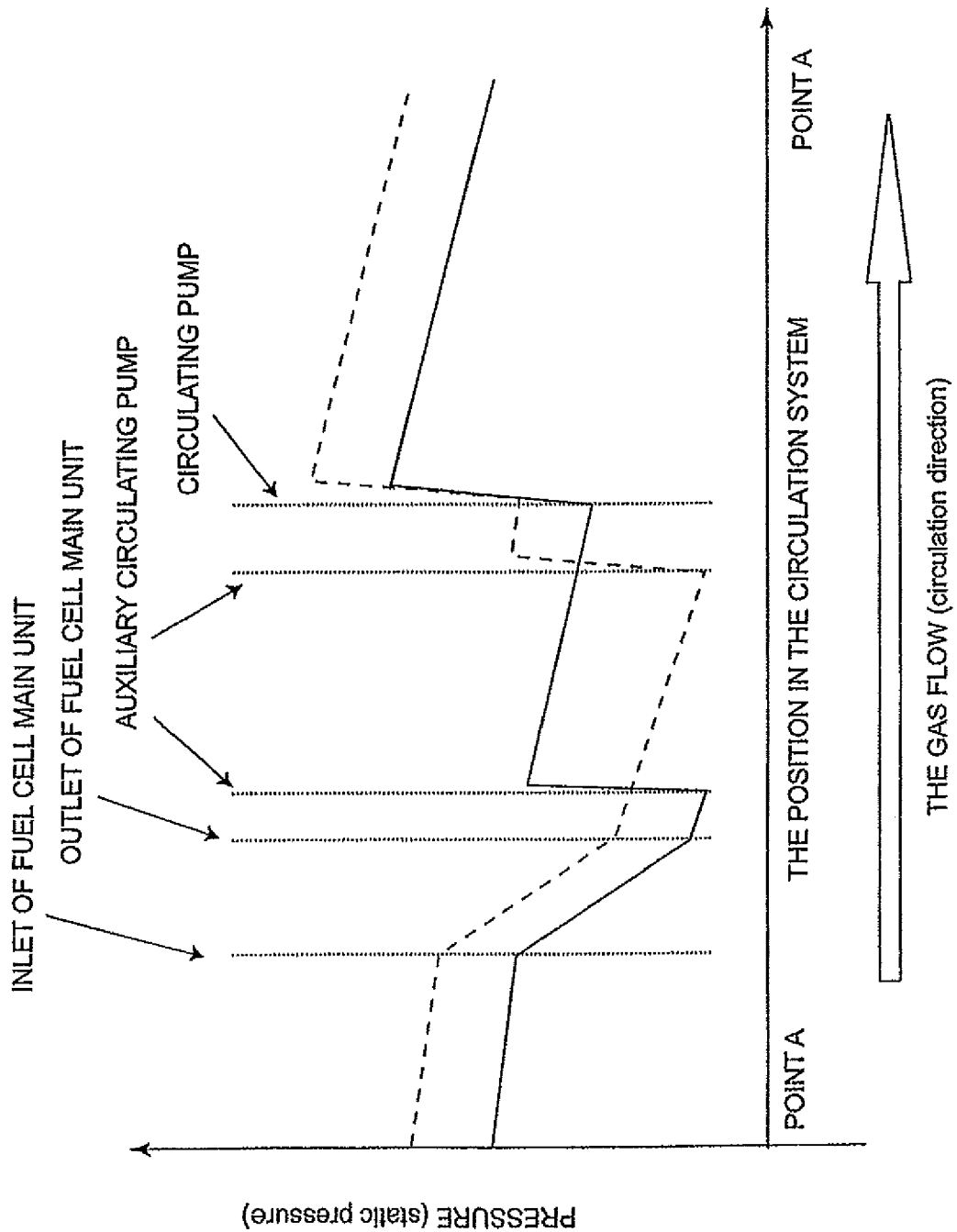
FIG. 22 is a diagram showing the pressure changes (static pressure) of the gas that flows through the circulation flow channel system.

In FIG. 22 shows the changes in the pressure (static pressure) of the gas that flows from the divergence between hydrogen supply flow channel 2a and bypass flow channel 6 (hereafter referred to as Point A; refer to FIG. 20) to fuel cell 1 and to first and second bypass flow channels 6 and 32.

Gas flows from Point A toward fuel cell 1 and when this takes place, pressure loss occurs in the line that forms hydrogen supply flow channel 2a, and an even greater pressure loss occurs inside fuel cell 1. After this, the gas that flows out of fuel cell 1 flows into second bypass flow channel 32, and the pressure rises due to the pump head of auxiliary circulating pump 33 installed on second bypass flow channel 32. After this, the pressure drops due to pressure loss in the lines for bypass flow channel 6 and second bypass flow channel 32, but it is pressurized again by hydrogen circulating pump 7, pressure loss from the lines occurs, and the gas returns to Point A.

At this point, assume that the position at which auxiliary pump 33 is installed is upstream in the vicinity of circulating pump 7 on bypass flow channel 6 instead of on bypass flow channel 32. Here, the distance from the outlet of fuel cell 1 to circulating pump 33 is set up so that it is further for the assumed position than the position described in the present embodiment. The changes in the pressure for this situation are indicated by the dashed lines in FIG. 22. As can be seen from this comparison, the pressure inside of fuel cell 1 changes according to the position of auxiliary circulating pump 33, and the internal pressure of fuel cell 1 can be lowered by placing the circulating pump directly to the rear of the outlet of fuel cell 1. Similarly, if circulating pump 7 is placed directly to the rear of the outlet of fuel cell 1, the same effect can be expected.

However, on the other hand, under normal operating conditions, since only circulating pump 7 is used, a higher hydrogen pressure will amount to a higher output performance by fuel cell 1. Therefore, it is desirable to place auxiliary pump 33 that is only used for the start-up directly to the rear of the outlet of fuel cell 1, and circulating pump 7 in a position that is far from the outlet. In this manner, by placing auxiliary pump 33 directly to the rear of the outlet of fuel cell 1, the introduction of hydrogen to fuel cell 1 can be conducted in a shorter amount of time.

For the present embodiment, in addition to the effects described in Embodiment 6, the effects described below can also be expected. In other words, by providing auxiliary circulating pump 33, which is used for the start-up, in addition to circulating pump 7, which is used under normal operating conditions, the circulation volume for the start-up is increased, the oxygen in the anode generated by the combustion reaction that takes place at the anode is consumed in a short amount of time, and the oxidation degradation in the cathode, as shown in Formula (3), can be suppressed.

In addition, since the corrosion of the carbon carrier itself, or the oxidation degradation, occurs as is shown in Formula (3), the reduction of the circulation volume can be determined by measuring the concentration of carbon dioxide in the gas that is exhausted from the cathode by means of concentration sensor 36.

Furthermore, by placing auxiliary circulating pump 33 on bypass flow channels 6 and 32 in the vicinity of the fuel outlet of fuel cell 1, compared to when it is placed in the vicinity of the inlet of fuel cell 1, the pressure in the vicinity of the anode of fuel cell 1 and the vicinity of the outlet of fuel cell 1 becomes relatively lower due to the effects of the negative suction pressure. Therefore, the time required to supply hydrogen to fuel cell 1 can be reduced.

Figure 23:
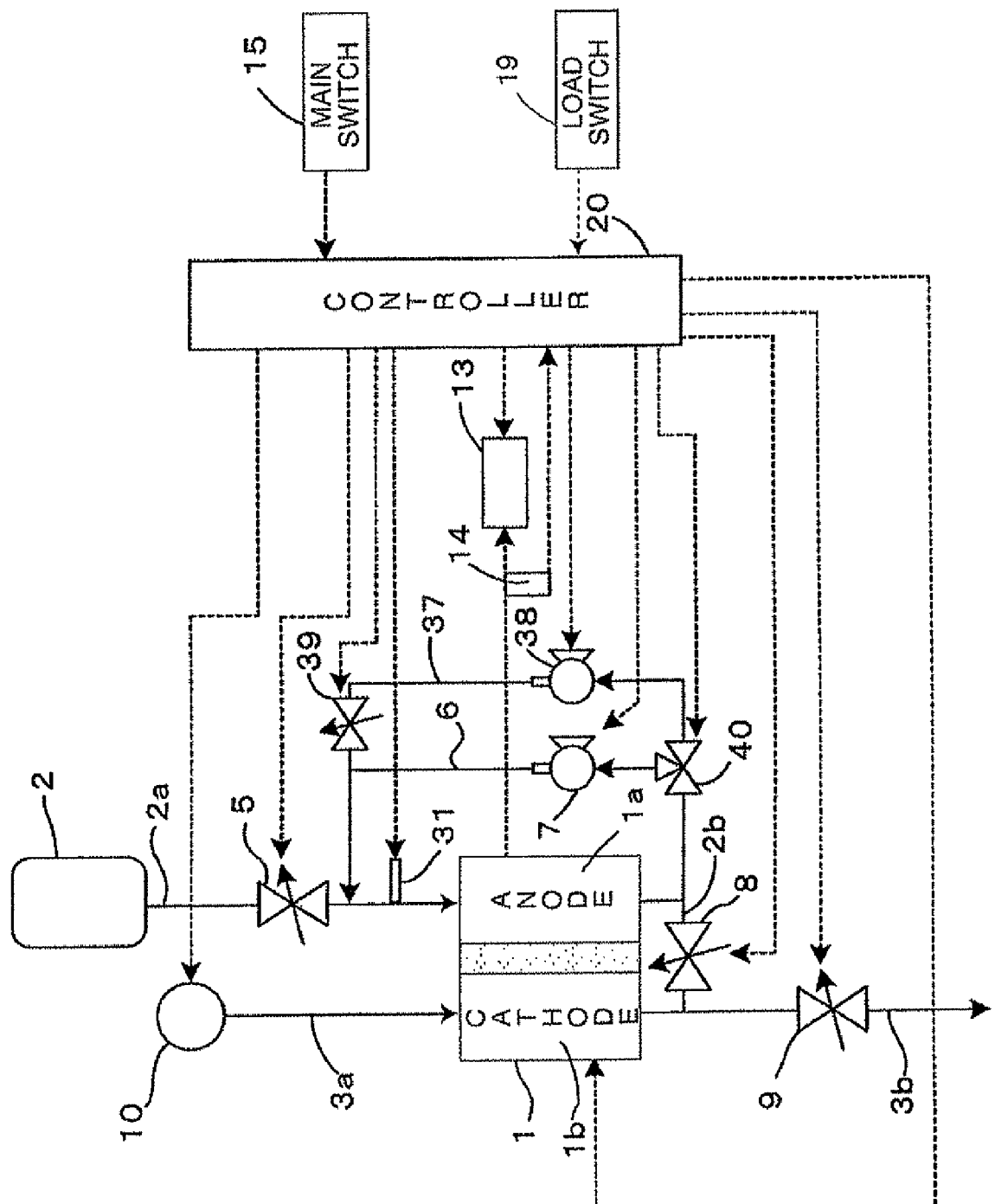
FIG. 23 is a block diagram of Embodiment 8.

FIG. 23 shows the constitution of Embodiment 8. Compared to the constitution of Embodiment 5 shown in FIG. 13, this embodiment differs in that third bypass flow channel 37 that diverges from circulating pump 7 on bypass flow channel 6 is provided and on this third bypass flow channel 37 is provided auxiliary circulating pump 38 that has a larger pump head than circulating pump 7. Further provided on third bypass flow channel 37 downstream of auxiliary circulating pump 33 is control valve 39, and at the divergence on the upstream side of bypass flow channel 6 and third bypass flow channel 37 is provided three-way valve 40. Auxiliary circulating pump 38, control valve 39 and three-way valve 40 are controlled by controller 20.

Figure 24:
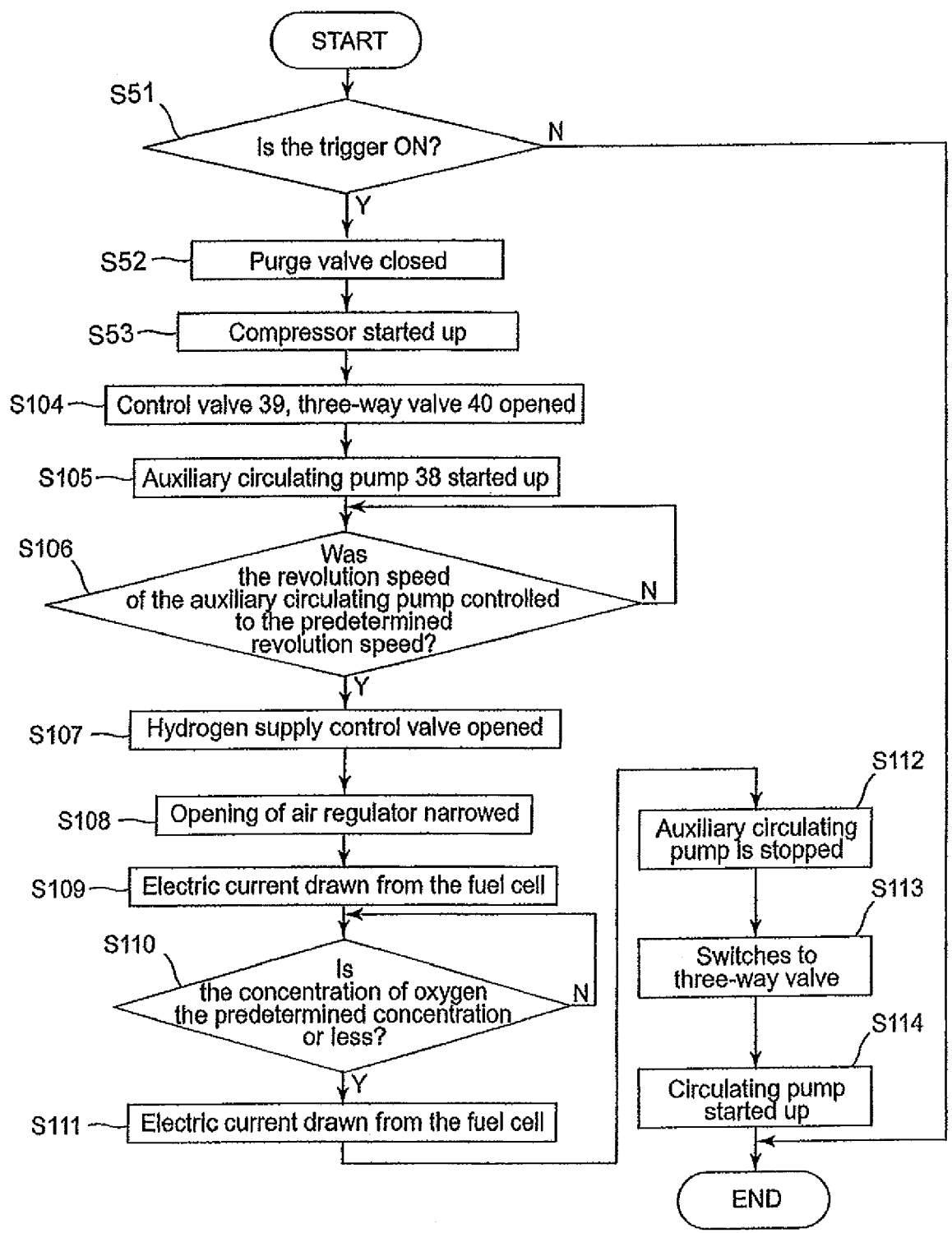
FIG. 24 is a flowchart for explaining the control process for Embodiment 8.

FIG. 24 is a flow chart for explaining the control process executed by controller 20 when starting up the fuel cell system for the present embodiment. This start-up control is the control that is executed when in the unloaded state, or when oxidant gas (air) is present inside of anode 1*a*, hydrogen supply flow channel 2*a* and the bypass flow channel. The contents of the control for Steps S51 through S53 are the same as those for Embodiment 5, so further explanation has been omitted.

Next, at Step S104, control valve 39 provided at third bypass flow channel 37 is opened and three-way valve 40 is controlled so that gas passes through third bypass flow channel 37. Next, at Step S105, auxiliary circulating pump 38 is started up. At this step, the rate of change (rate of increase) of the revolution speed of auxiliary circulating pump 38 is controlled to approximately the maximum controllable rate of change. In addition, the revolution speed of auxiliary circulating pump 38 also lacks stability in terms of control, just as was the case in Embodiment 7, but is controlled so that it reaches a predetermined revolution speed that is higher than the maximum revolution speed that is controllable and stable. Furthermore, as explained above, since the pump head capacity of the auxiliary pump is larger than that of circulating pump 7, the circulation volume is greater than that for Embodiments 5 and 6.

Then, at Step S106, it is determined whether or not the revolution speed of auxiliary circulating pump 38 has exceeded the maximum controllable revolution speed and has been controlled to the predetermined revolution speed. If it has been controlled, the process proceeds to Step S107, and at Step S107, hydrogen supply control valve 5 is opened, the pressure of the hydrogen in the hydrogen supply flow channel is pressurized, and supply of hydrogen to the anode begins. Further, at Step S108, the opening of air regulator 9 is narrowed and the air pressure in the cathode is pressurized. At this point, the pressurization time until the pressure of the air and the hydrogen, which is in an atmospheric pressure state, is pressurized to the predetermined pressure is controlled so that it is the shortest possible time.

At Step S109, an external load that consumes the electric power, which is not shown in the drawing, is used as the charge-consuming means in the same manner as the fixed resistance, and the current that flows in accordance with the start-up power generated by fuel cell 1 is drawn. In other words, the electric power that is to be drawn from the external load is not regulated, but instead the current that flows in accordance with the start-up power of fuel cell 1 changes in the same manner as the fixed resistance.

The process then moves to Step S110 and it is determined whether or not the oxygen concentration detected by concentration sensor 31 has reached the predetermined concentration (for example, 6%) or less, and it if has reached the predetermined concentration or less, a load current that corresponds with the idle state is drawn from fuel cell 1 at Step S111.

At this point, power manager 13 is operated in the load current (output) draw mode that corresponds to the normal operation of fuel cell 1. At Step S110, hydrogen and air are supplied to the anode and cathode, respectively, so when using a charge-consuming function, it is desirable to use the oxygen concentration to determine the concentration. In addition, the method used to decide the predetermined concentration is as explained in Embodiment 5. Next, at Step S112, auxiliary circulating pump 38 is stopped, at Step S113, control valve 39 is closed, and three-way valve 40 is switched so that gas flows through bypass flow channel 6. Finally, at Step S114, operation of hydrogen circulating pump 7 is begun at a revolution speed that corresponds with the idle state, the start-up control is ended, and the process switches to normal control.

Therefore, for the present embodiment, in addition to the effects described in Embodiment 6, since the pump head capacity (=circulating force) of auxiliary circulating pump 38 used for the start-up is larger than the pump head capacity of circulating pump 7 used for normal operation, it becomes possible to temporarily increase the circulation volume at the start-up. Therefore, the residual oxygen is quickly consumed in a short amount of time due to the combustion reaction that takes place at the anode, and the oxidation degradation of the cathode, as represented by Formula (3), can be suppressed to a minimum.

Furthermore, after the hydrogen is introduced, at the point at which the oxygen concentration in the vicinity of the anode and inside the hydrogen supply flow channel gets closer to zero, the oxidation degradation reaction at the cathode can be suppressed, so the circulation volume can be reduced from the standpoint of deterioration.

In addition, by using a charge-consuming means, the reaction in Formula (3) can be suppressed, and the oxidation degradation at the cathode that takes place at the start-up can be significantly reduced.

Figure 25:
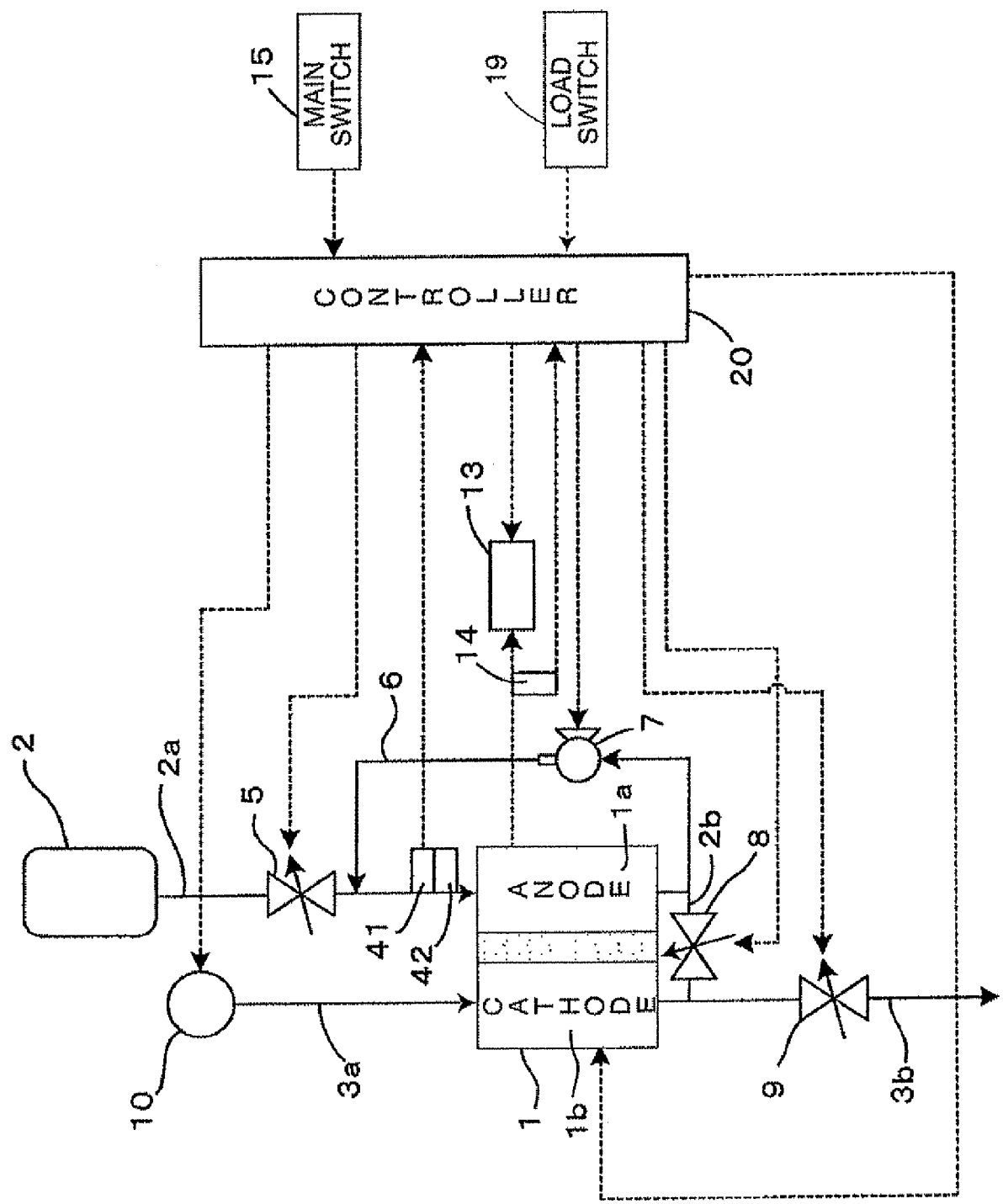
FIG. 25 is a block diagram of Embodiment 9.

FIG. 25 shows the constitution of Embodiment 9. Compared to the constitution of Embodiment 5 shown in FIG. 13, the present embodiment is different in that instead of providing oxygen concentration sensor 31, combustion catalyst 41 and gas/liquid separator 42 have been provided to eliminate the oxygen inside of hydrogen supply flow channel 2a.

Figure 26:
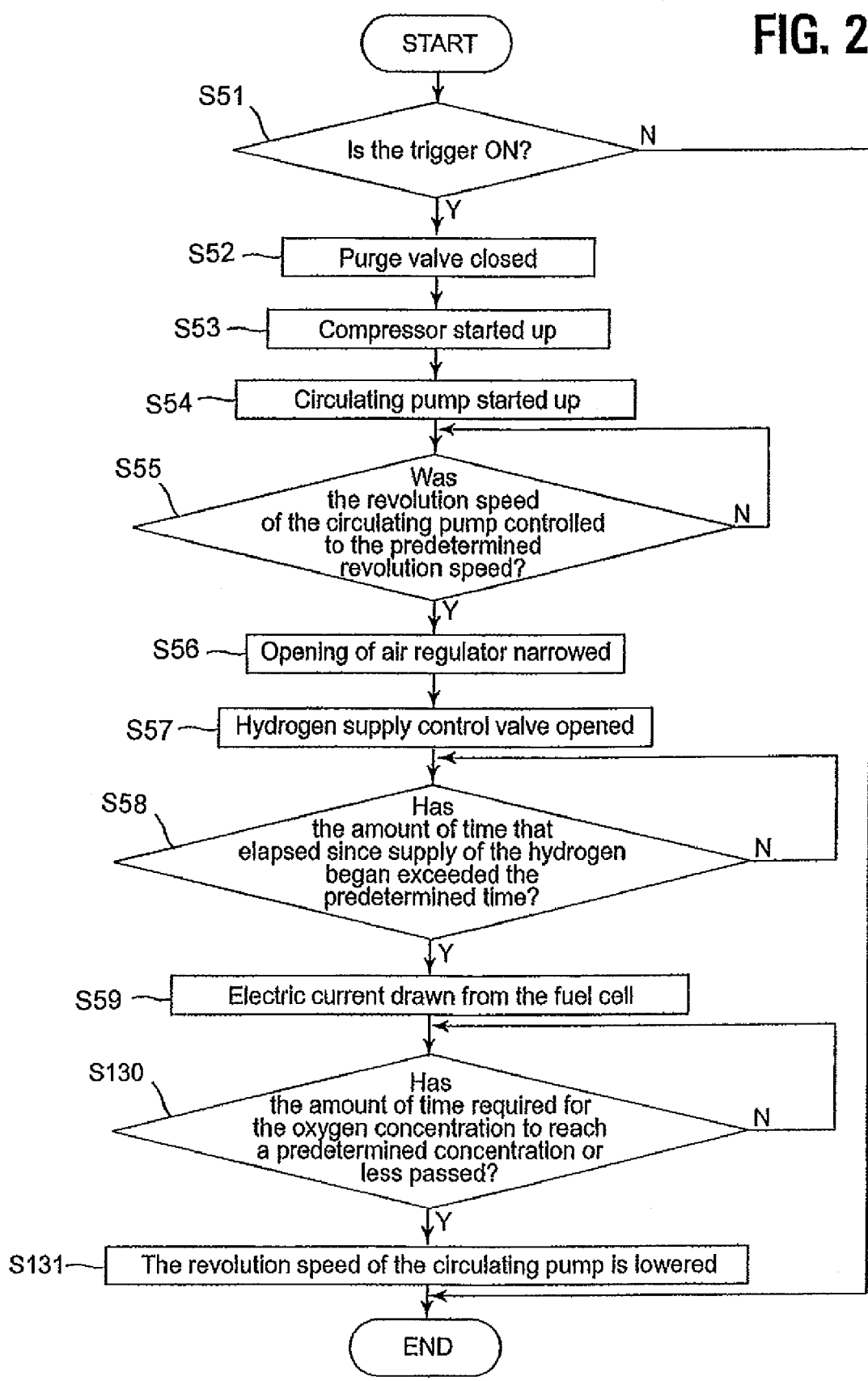
FIG. 26 is a flowchart for explaining the control process for Embodiment 9.

FIG. 26 is a flow chart for explaining the control process executed by controller 20 when starting up the fuel cell system for the present embodiment. This start-up control is the control that is executed when in the unloaded state, or when oxidant gas (air) is present inside of anode 1a, hydrogen supply flow channel 2a and bypass flow channel 6. The contents of the control for Steps S51 through S59 are the same as those for Embodiment 5, so further explanation has been omitted.

Next, at Step S130, it is determined whether or not the amount of time elapsed since the supply of hydrogen was started at Step S57 has exceeded the predetermined amount of time required for the residual oxygen in the anode to get consumed by combustion catalyst 41. For this step, the predetermined time is the time required for the concentration of oxygen remaining in the anode to reach the predetermined concentration, for example 6% or less. When the time elapsed exceeds the predetermined time, the process proceeds to Step S131, the revolution speed of circulating pump 7 is lowered to the revolution speed that corresponds to the idle state, and the control process is ended.

For the present embodiment, in addition to the effects of Embodiment 5, the following effects can also be achieved. In other words, by providing combustion catalyst (oxygen concentration reducing means) 41 downstream of the divergence of hydrogen supply flow channel 2a and bypass flow channel 6 at the hydrogen inlet of fuel cell 1 so that when exhaust anode gas containing oxygen is introduced immediately after operation of circulating pump 7 is begun (for the first circulation cycle), the concentration of residual oxygen in the circulation flow channel system, which consists of hydrogen supply flow channel 2a, gas emission flow channel 2b and bypass flow channel 6, is reduced by combustion catalyst 41. Because of this, the concentration of the oxygen in the exhaust anode gas supplied to fuel cell 1 decreases. Therefore, the time required for the residual oxygen to be consumed due to the combustion reaction that takes place at the anode in Embodiment 1 is reduced, and the oxidation degradation of the cathode can be even further suppressed.

In addition, by providing combustion catalyst 41 for combusting the fuel, such as hydrogen, the combustion reaction between the hydrogen and oxygen primarily takes place at combustion catalyst 41 instead of the anode. Therefore, the oxygen concentration can be quickly lowered in an even shorter amount of time. In addition, when the residual moisture in bypass flow channel 6 is supplied to the anode of fuel cell 1 together with the exhaust anode gas, the moisture in the anode goes to the cathode via the electrolyte membrane and the amount of moisture in the vicinity of the cathode increases. Therefore, the reaction that promotes the oxidation degradation of the cathode, as shown in Formula (3), progresses. Therefore, by eliminating the moisture that is conducted to the anode beforehand by means of gas/liquid separator 42, the oxidation degradation of the cathode can be suppressed. Furthermore, by eliminating the residual moisture in bypass flow channel 6 beforehand, the distribution of fuel to each single cell of fuel cell 1 can be improved.

Moreover, since water is generated by combustion catalyst 41 from the combustion reaction that takes place, by placing combustion catalyst 41 either inside or upstream of gas/liquid separator 42, the moisture generated by combustion catalyst 41 can be effectively eliminated by gas/liquid separator 42.

Figure 27:
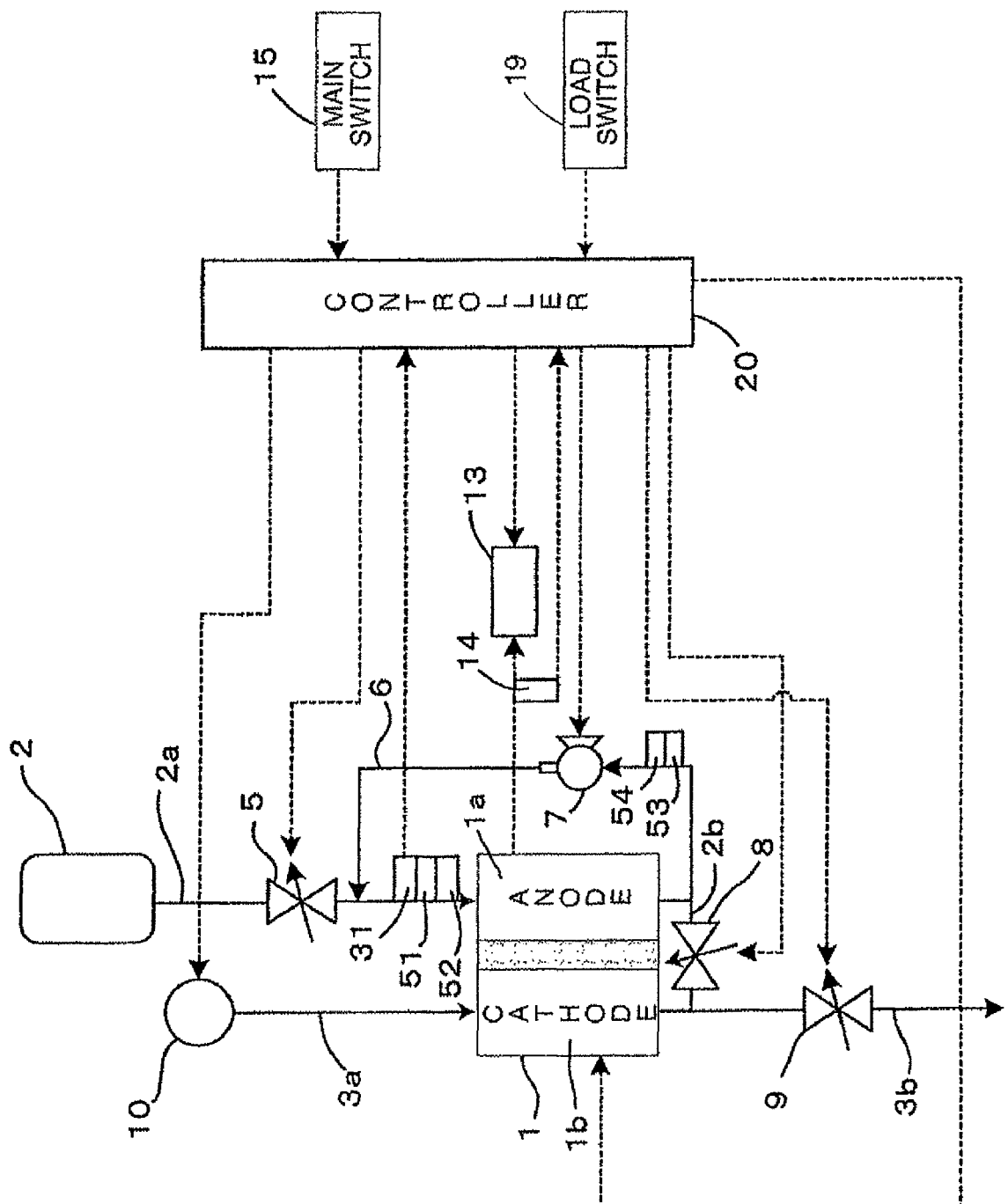
FIG. 27 is a block diagram of Embodiment 10.

FIG. 27 shows the constitution of Embodiment 10. Compared to the constitution of Embodiment 5 shown in FIG. 13, the constitution for this embodiment differs in that first oxygen absorbent 51 and first gas/liquid separator 52 are installed between oxygen concentration sensor 31 and fuel cell 1 and second oxygen absorbent 53 and second gas/liquid separator 54 are further installed upstream of circulating pump 7 on bypass flow channel 6.

Figure 28:
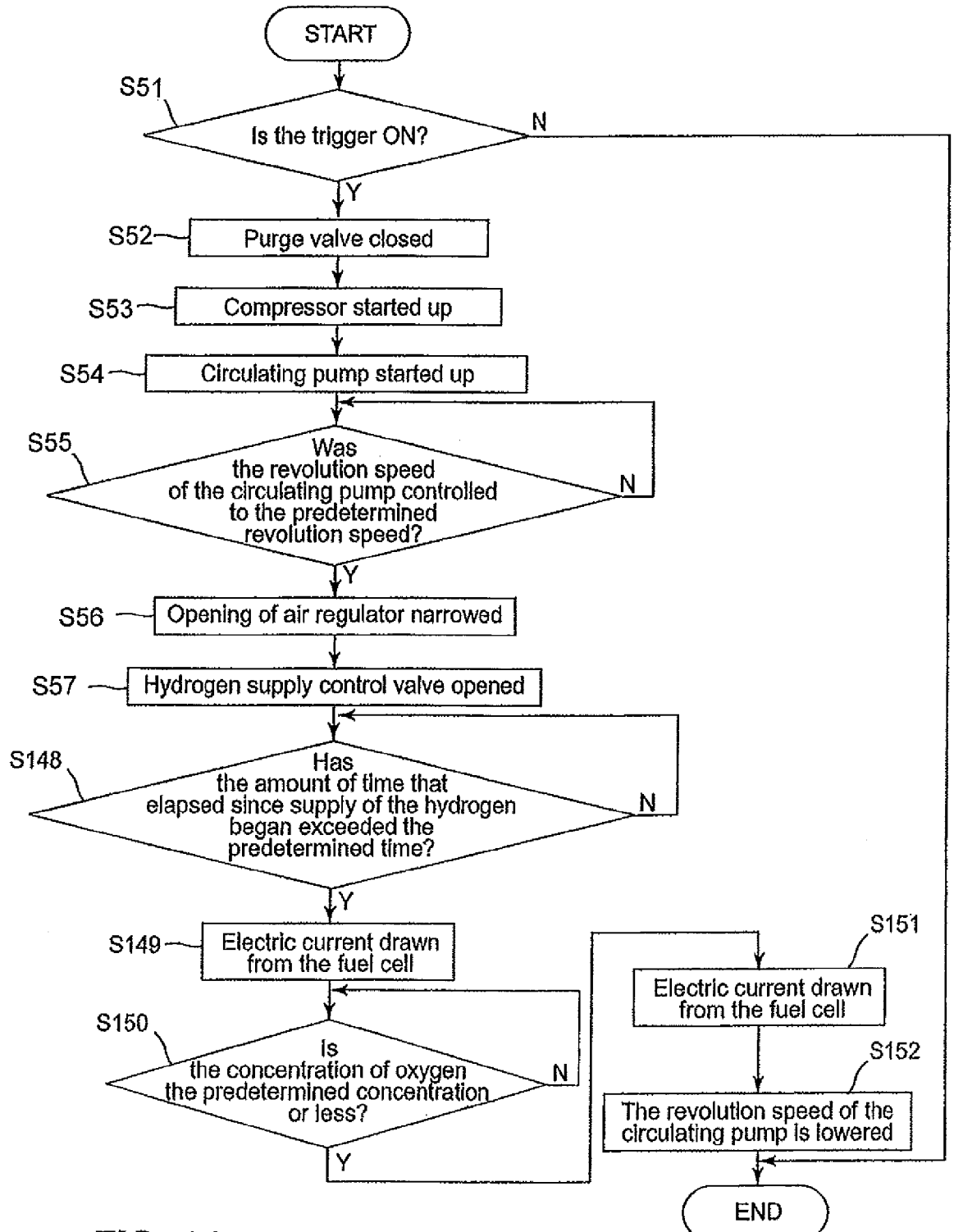
FIG. 28 is a flowchart for explaining the control process for Embodiment 10.

FIG. 28 is a flow chart for explaining the control process executed by controller 20 when starting up the fuel cell system for the present embodiment. This start-up control is the control that is executed when in the unloaded state, or when oxidant gas (air) is present inside of anode 1a, hydrogen supply flow channel 2a and bypass flow channel 6. The contents of the control for Steps S51 through S57 are the same as those for Embodiment 5, so an explanation has been omitted.

Next, at Step S148, it is determined whether or not the amount of time that has elapsed since the supply of hydrogen started has exceeded the predetermined time. Here, the predetermined time is established as the predicted amount of time required for the hydrogen to flow completely into the anode. When the predetermined time has elapsed, the process proceeds to Step S149, and at Step S149, the external load that consumes the electric power, which is not shown in the drawing, is used for the charge-consuming function in the same manner as the fixed resistance, and the current that flows in accordance with the start-up power generated by fuel cell 1 is drawn. In other words, the electric power that is to be drawn from the external load is not regulated, but instead the current that flows in accordance with the start-up power of fuel cell 1 changes in the same manner as the fixed resistance. Next, the process switches to Step S150, and it is determined whether or not the concentration of oxygen detected by concentration sensor 31 is less than the predetermined concentration (for example, 6%). If the oxygen concentration is lower than the predetermined concentration, the load current that corresponds to the idle state is drawn by fuel cell 1 at Step S151. At this step, power manager 13 is operated in the load current (output) draw mode that corresponds to the control executed under normal operation. At Step S150, hydrogen and air are supplied to the anode and cathode, respectively, so when using a charge-consuming function, it is desirable to use the oxygen concentration to determine the concentration. In addition, the method used to decide the predetermined concentration is as explained in Embodiment 5.

At Step S151, the drawing of electric current from fuel cell 1 is started. At this point, a minute amount of load current that corresponds to the idle state is drawn, and at Step S152, the revolution speed of circulating pump 7 is lowered to correspond with the idle state and the control process is ended.

For the present embodiment, in addition to the effects of Embodiment 5, the following effects can also be achieved. In other words, by providing oxygen absorbents 51 and 53 (oxygen concentration reducing means) on the circulation flow channel system through which the hydrogen and residual oxygen are circulated, the concentration of the oxygen in the gas that flows through the circulation flow channel system is reduced, so the concentration of oxygen introduced to the anode is smaller. Therefore, since the time in which the residual oxygen gets consumed due to the combustion reaction that takes place at the anode is shorter, the oxidation degradation of the cathode, as shown in Formula (3), is significantly suppressed. Furthermore, compared to the combustion catalyst in Embodiment 9, the acceleration of the deterioration of the performance of the fuel cell system that is brought on by the increase in the concentration of cation (concentration of contamination) in the drain water from the elution of the catalyst metal can be suppressed.

In addition, by providing first oxygen absorbent 51 (oxygen concentration reducing means) downstream (on the side at which fuel cell 1 is located) of the divergence of hydrogen supply flow channel 2a and bypass flow channel 6 at the inlet of fuel cell 1, so that when hydrogen is introduced immediately after operation of circulating pump 7 is begun (for the first circulation cycle), the concentration of oxygen is reduced before the residual oxygen in the circulation flow channel system and the hydrogen introduced are introduced to the anode of fuel cell 1. Therefore, the time required to consume the residual oxygen by means of the combustion reaction that takes place at the anode gets shorter and the oxidation degradation that takes place at the cathode can be suppressed.

Furthermore, by providing first and second gas/liquid separators 52 and 54 on the circulation flow channel system through which the hydrogen and residual oxygen are circulated, the moisture supplied to the anode of fuel cell 1 is reduced. Therefore, the deterioration of the performance of circulating pump 7, which is easily affected by moisture, can be suppressed. For this embodiment, compared to Embodiment 9, the moisture can be sufficiently eliminated by providing second gas/liquid separator 54 directly upstream of circulating pump 7. And additionally, by providing second oxygen absorbent 53 directly upstream of circulating pump 7, the moisture can be sufficiently eliminated.

Figure 29:
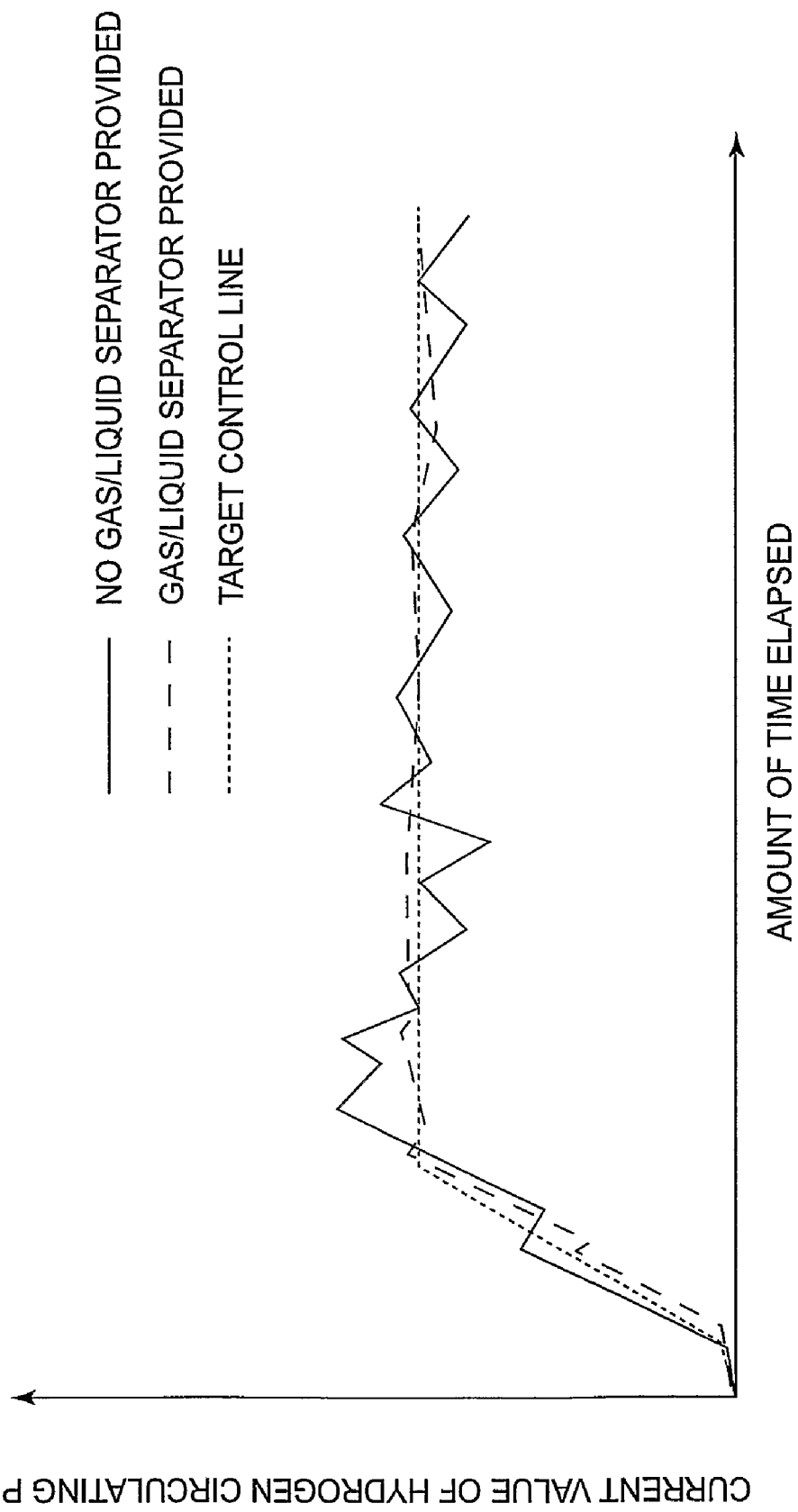
FIG. 29 is a diagram showing the time series changes in the control current values for the current that flows through the circulating pump for when a gas/liquid separator is and is not provided directly upstream of the circulating pump.

FIG. 29 shows the time series changes in the control current values for the current that flows through circulating pump 7 for when second gas/liquid separator 54 is and is not provided directly upstream of circulating pump 7. As can be seen from the diagram, control is executed more precisely at a state that is closer to the target control current when second gas/liquid separator 54 is provided than when it is not. This is believed to be due to the differences in the volumes of moisture, so when second gas/liquid separator 54 is not provided, moisture gets incorporated into circulating pump 7 and as can be seen from the diagram, the transient current increases.

Furthermore, when the moisture remaining in the circulation flow channel system is supplied to the anode of fuel cell 1 together with the hydrogen, the moisture in the anode goes to the cathode via the electrolyte membrane and the moisture in the vicinity of the cathode increases. Therefore, the reaction that promotes the oxidation degradation of the cathode progresses (for example, Formula (3)). Therefore, by eliminating the moisture that is conducted to the anode beforehand by means of first gas/liquid separator 52, the oxidation degradation can be suppressed. Furthermore, by eliminating the residual moisture in the circulation flow channel system beforehand, the distribution of fuel to each single cell of fuel cell 1 can be improved.

The present invention is not limited to the embodiments described above, and it goes without saying that various changes may be made as long as they are within the scope of the technical concept of the present invention.

What is claimed is:

1. A fuel cell system comprising:
   a fuel cell that generates power with fuel gas and oxidant gas;
   a fuel supply line that is connected between a fuel gas supply device and the fuel cell and through which fuel gas supplied to the fuel cell flows;
   a fuel gas supply control valve installed on the fuel supply line that is for adjusting an amount of fuel gas supplied from the fuel gas supply device;
   a fuel exhaust line that is connected to the fuel cell and through which fuel gas exhausted from the fuel cell flows;
   a bypass line that connects the fuel supply line with the fuel exhaust line;
   a circulating pump installed on the bypass line so as to circulate the fuel gas exhausted from the fuel cell so that it travels from the fuel exhaust line to the fuel supply line;
   a purge valve installed on the fuel exhaust line so as to exhaust the fuel gas to outside of the fuel cell;
   a sensor that detects or estimates a fuel gas concentration of the fuel gas that flows into the fuel cell; and
   a controller configured to perform a start-up control when oxidant is detected or estimated in an anode of the fuel cell when the fuel cell starts up from an unloaded state in which the fuel cell is not generating an electrical output, wherein the controller is configured to:
   first close the purge valve;
   then control a revolution speed of the circulating pump while the purge valve is closed to pull the fuel gas having oxidant in the fuel cell into the fuel supply line;
   after starting operation of the circulating pump, control an amount of an opening of the fuel gas supply control valve so that a fuel gas concentration of a mixture of the fuel gas and the fuel gas having oxidant that flows into the fuel cell as detected or estimated by the sensor reaches a predetermined concentration;
   circulate the mixture through the fuel cell for a predetermined time; and
   start power generation and open the purge valve, in response to the elapse of the predetermined time.

2. The fuel cell system according to claim 1 further comprising:
   a circulation volume control valve on the bypass line;
   wherein the controller is configured to adjust the fuel gas concentration by controlling the revolution speed of the circulating pump and an opening of the circulation volume control valve while the purge valve is closed and before the fuel cell generates the electrical output.

3. The fuel cell system according to claim 1 wherein the controller is configured to control the revolution speed of the circulating pump at a maximum revolution speed that can be controlled in a stable manner under normal operating conditions while the purge valve is closed and before the fuel cell generates the electrical output.

4. The fuel cell system according to claim 1 wherein the controller is configured to control the revolution speed of the circulating pump by increasing the revolution speed at a maximum rate of change while the purge valve is closed and before the fuel cell generates the electrical output.

5. The fuel cell system according to claim 1, wherein the circulating pump is a first circulating pump and the bypass line is a first bypass line, and further comprising:
   a second bypass line that connects the fuel exhaust line and the first bypass line and connects upstream of the first circulating pump; and
   a second circulating pump provided on the second bypass line;
   wherein the controller is configured to control the first and second circulating pumps while the purge valve is closed and before the fuel cell generates the electrical output so that the fuel gas concentration of the mixture that flows into the fuel cell reaches the predetermined concentration or more.

6. The fuel cell system according to claim 1, wherein the circulating pump is a first circulating pump and the bypass line is a first bypass line, and further comprising:

a second bypass line that connects the fuel exhaust line with the fuel supply line; and a second circulating pump installed on the second bypass line;

wherein the first and second circulating pumps provide different circulation forces respectively on the first and second bypass lines; and wherein the controller is configured to control the revolution speed of the circulating pump while the purge valve is closed and before the fuel cell generates the electrical output by rotating one of the first or the second circulating pump that has the greatest circulation force.

7. The fuel cell system according to claim 6 wherein the sensor is a carbon dioxide sensor that detects a concentration of carbon dioxide contained in the oxidant gas that is exhausted from a cathode of the fuel cell, and wherein the controller is configured to adjust the fuel gas concentration while the purge valve is closed and before the fuel cell generates the electrical output by controlling the revolution speed of the circulating pump and the opening of the fuel gas supply control valve so that the carbon dioxide concentration reaches a predetermined concentration or less.

8. The fuel cell system according to claim 1, wherein the sensor is a hydrogen concentration sensor, the fuel cell further comprising:

an oxygen concentration detection device provided in one of the fuel supply line, the fuel exhaust line and the bypass line, wherein the controller is configured to control the revolution speed of the circulating pump while controlling the amount of the opening of the fuel gas supply control valve so that the hydrogen concentration of the mixture that flows into the fuel cell as detected by the hydrogen concentration sensor reaches at least a predetermined concentration and an oxygen concentration detected by the oxygen concentration detection device is at or less than a predetermined concentration.

9. The fuel cell system according to claim 8 further comprising:

a gas/liquid separator provided in a flow channel through which the fuel gas exhausted from the fuel cell flows that separates the gas and liquid.

10. The fuel cell system according to claim 1 wherein the sensor is a hydrogen concentration sensor that detects a concentration of the hydrogen contained in the mixture that flows into the fuel cell, and wherein the controller is configured to adjust the fuel gas concentration while the purge valve is closed and before the fuel cell generates the electrical output by controlling the revolution speed of the circulating pump and the opening of the fuel gas supply control valve so that the hydrogen concentration reaches a predetermined concentration or more.

11. The fuel cell system according to claim 1 wherein the sensor is an oxygen concentration sensor that detects the concentration of the oxygen contained in the mixture that flows into and is exhausted from the fuel cell, and wherein the controller is configured to adjust the fuel gas concentration while the purge valve is closed and before the fuel cell generates the electrical output by controlling the revolution speed of the circulating pump and the opening of the fuel gas supply control valve so that the oxygen concentration reaches a predetermined concentration or less.

12. The fuel cell system according to claim 1 wherein the sensor is a voltage sensor that detects a voltage of an open circuit of the fuel cell, and wherein the controller is configured to adjust the fuel gas concentration while the purge valve is closed and before the fuel cell generates the electrical output by controlling the revolution speed of the circulating pump and the opening of the fuel gas supply control valve so that the voltage of the open circuit reaches a predetermined value or more.

13. The fuel cell system according to claim 1 wherein the sensor is a voltage sensor that detects a change in voltage of the fuel cell, and wherein the controller is configured to adjust the fuel gas concentration while the purge valve is closed and before the fuel cell generates the electrical output by controlling the revolution speed of the circulating pump and the opening of the fuel gas supply control valve so that the change in voltage is a predetermined value or less.

14. The fuel cell system according to claim 1 wherein the controller is configured to control the circulating pump while the purge valve is closed and before the fuel cell generates the electrical output so that a volume of gas that flows from the bypass line to the fuel supply line is a predetermined value or less in relation to a volume of fuel gas supplied through the fuel gas supply control valve.

15. The fuel cell system according to claim 1 wherein the controller is configured to control the revolution speed of the circulating pump to a maximum revolution speed that can be controlled in a stable manner under normal operating conditions after the purge valve is closed and is configured to lower the revolution speed of the circulating pump to a speed that corresponds to an idle state at which the fuel cell system can generate the electrical output and in which the electrical output is not being supplied to an external load after the fuel gas concentration reaches the predetermined concentration or more.

16. The fuel cell system of claim 1, wherein the controller is configured to perform the start up control if the fuel cell has been in the unloaded state for at least a predetermined period of time.

17. A fuel cell system equipped with a hydrogen supply flow channel that supplies hydrogen from a hydrogen supply source of a fuel cell to an anode of the fuel cell and a bypass flow channel connected midstream to the hydrogen supply flow channel so as to circulate exhaust anode gas exhausted from the anode back to the anode, wherein the fuel cell system comprises:

a purge valve for selectively controlling exhaust of the exhaust anode gas to outside of the fuel cell; and a controller configured to perform a start-up control when oxidant is detected in an anode of the fuel cell, the controller including:

circulating means for closing the purge valve at start-up of the fuel cell from an unloaded state in which the fuel cell is not generating an electrical output and for starting a circulation pump after closing the purge value and then controlling a revolution speed of the circulation pump so as to circulate the exhaust anode gas to the anode via the bypass flow channel, wherein the circulation pump is started and controlled for a predetermined time;

gas composition control means for controlling a composition of a gas mixture including the exhaust anode gas and the hydrogen from the hydrogen supply source while the purge valve is closed and after starting the circulation pump and before the fuel cell generates the electrical output by controlling an amount of hydrogen supply so that a concentration of a gas that constitutes the gas mixture reaches a predetermined concentration; and electrical output generation means for opening the purge valve and starting electrical output generation by the fuel cell in response to the elapse of the predetermined time.

18. A method of operating a fuel cell comprising an anode, a cathode, and a proton-exchange membrane disposed between the anode and cathode, the method comprising:
- determining whether a request has been made to start up the fuel cell from an unloaded state in which the fuel cell is not generating an electrical output;
- detecting oxidant in the anode of the fuel cell;
- responsive to the request being made and oxidant detected in the anode, closing a purge valve for exhausting the exhaust anode gas from the anode to outside of the fuel cell;
- directing an exhaust anode gas exhausted from an outlet of the anode back to an inlet of the anode using a bypass flow channel from the outlet to the inlet while maintaining the purge valve in a closed position and before the fuel cell generates the electrical output by starting a circulating pump in the bypass flow channel;
- starting supply of hydrogen to the fuel cell after closing the purge valve and after starting the circulating pump;
- controlling addition of the hydrogen to the exhaust anode gas before the exhaust anode gas reaches the inlet while the purge valve is in the closed position and before the fuel cell generates the electrical output; and
- controlling a revolution speed of the circulating pump in the bypass flow channel while the purge valve is closed and while controlling addition of the hydrogen and before the fuel cell generates the electrical output so that a fuel gas concentration of a mixture of the fuel gas and the exhaust anode gas that flows into the fuel cell reaches a predetermined concentration or more; and
- opening the purge valve and starting electrical output generation by the fuel cell in response to the elapse of a predetermined time.

19. The method of claim 18 further comprising determining an amount of oxygen in the exhaust anode gas.

20. The method of claim 19, wherein determining an amount of oxygen in the exhaust anode gas is based on a time that has elapsed from starting the addition of the hydrogen to the exhaust anode gas.

21. The method of claim 18 further comprising directing the exhaust anode gas exhausted from the anode to the outside of the fuel cell by opening the purge valve when the exhaust anode gas no longer comprises oxygen.

22. The method of claim 18 further comprising starting up the fuel cell, when the exhaust anode gas no longer contains oxygen, so that the fuel cell produces the electrical output.

23. The method of claim 18 further comprising determining a concentration of the hydrogen in the exhaust anode gas after adding the hydrogen thereto but before the mixture arrives at the inlet.

24. The method of claim 23 further comprising setting a volume of the exhaust anode gas that is directed to the inlet according to the concentration of the hydrogen in the exhaust anode gas.

25. A fuel-cell controller for a fuel cell, the fuel cell comprising an anode, a cathode, and a proton-exchange membrane disposed between the anode and cathode, the fuel-cell controller comprising:
- means for determining whether a request has been made to start up the fuel cell from an unloaded state in which the fuel cell is not generating an electrical output;
- means for closing a purge value for exhausting exhaust anode gas from the anode to outside of the fuel cell responsive to the request being made;
- means for starting a circulating pump in a bypass flow channel in a bypass flow channel extending from an outlet of the anode back to an inlet of the anode responsive to the request being made;
- means for starting supply of hydrogen to the fuel cell after closing the purge valve and after starting the circulating pump;
- means for detecting oxidant in the anode;
- means, responsive to both the request being made and oxidant detected, for controlling a circulation volume of an exhaust anode gas exhausted from the outlet back to the inlet by controlling the circulating pump while maintaining the purge valve in a closed position before the fuel cell generates the electrical output;
- means for controlling an amount of the hydrogen added to the exhaust anode gas using a control valve before the exhaust anode gas reaches the inlet while the purge valve is in the closed position after starting supply of the hydrogen and before the fuel cell generates the electrical output; and
- means for opening the purge valve and starting electrical output generation by the fuel cell in response to the elapsing of a predetermined time.

26. The fuel-cell controller of claim 25 further comprising means for determining a concentration of the hydrogen in the exhaust anode gas after adding the hydrogen thereto but before the exhaust anode gas arrives at the inlet using at least one sensed input.

27. The fuel-cell controller of claim 25 further comprising means for directing the exhaust anode gas exhausted from the anode to the outside of the fuel cell through the purge valve when the exhaust anode gas no longer comprises oxygen.

28. The fuel-cell controller of claim 25 further comprising means for setting the circulation volume of the exhaust anode gas that is directed to the inlet according to a concentration of the hydrogen in the exhaust anode gas.

* * * * *